United States Patent [19]

Gilliland

[11] Patent Number: 5,136,138
[45] Date of Patent: Aug. 4, 1992

[54] TRANSISTOR FAILURE SELECTION CIRCUIT AND STRUCTURE FOR EASE OF MAINTENANCE OF A WELDING STATION

[76] Inventor: Malcolm T. Gilliland, 310 Pine Valley Rd., Marietta, Ga. 30067

[21] Appl. No.: 776,599

[22] Filed: Oct. 11, 1991

Related U.S. Application Data

[60] Continuation of Ser. No. 612,814, Nov. 14, 1990, which is a division of Ser. No. 374,465, Jun. 30, 1989, Pat. No. 5,025,127.

[51] Int. Cl.$^5$ .............................................. B23K 9/10
[52] U.S. Cl. .................................... 319/130.1; 363/56
[58] Field of Search .......... 219/130.1, 137 PS, 130.31, 219/130.32, 130.33; 363/56

[56] References Cited

U.S. PATENT DOCUMENTS 4,409,465  10/1983  Yamamoto et al. ........... 219/137 PS
4,620,082  10/1986  Graville et al. ............... 219/137 PS Primary Examiner—Clifford C. Shaw
Attorney, Agent, or Firm—Jones, Askew & Lunsford

[57] ABSTRACT

A transistor failure selection circuit and structure for ease of maintenance. The disclosed circuit and structure reduce maintenance time and costs for a welding station. The circuit biases a specific selected transistor at a different operating point than any other transistor in a bank of transistors. Upon an overcurrent condition which exceeds the design current rating of the welding station the circuit causes the specific selected transistor to fail in preference to the failure of any other transistor located in the transistor bank. The selected transistor is mounted in a readily accessible location of the welding station and is easily replaced in the event of failure. This eliminates the need for the operator to remove the entire bank of transistors and/or other components or circuits typically found in a welding station in order to access and replace the failed transistor.

15 Claims, 14 Drawing Sheets

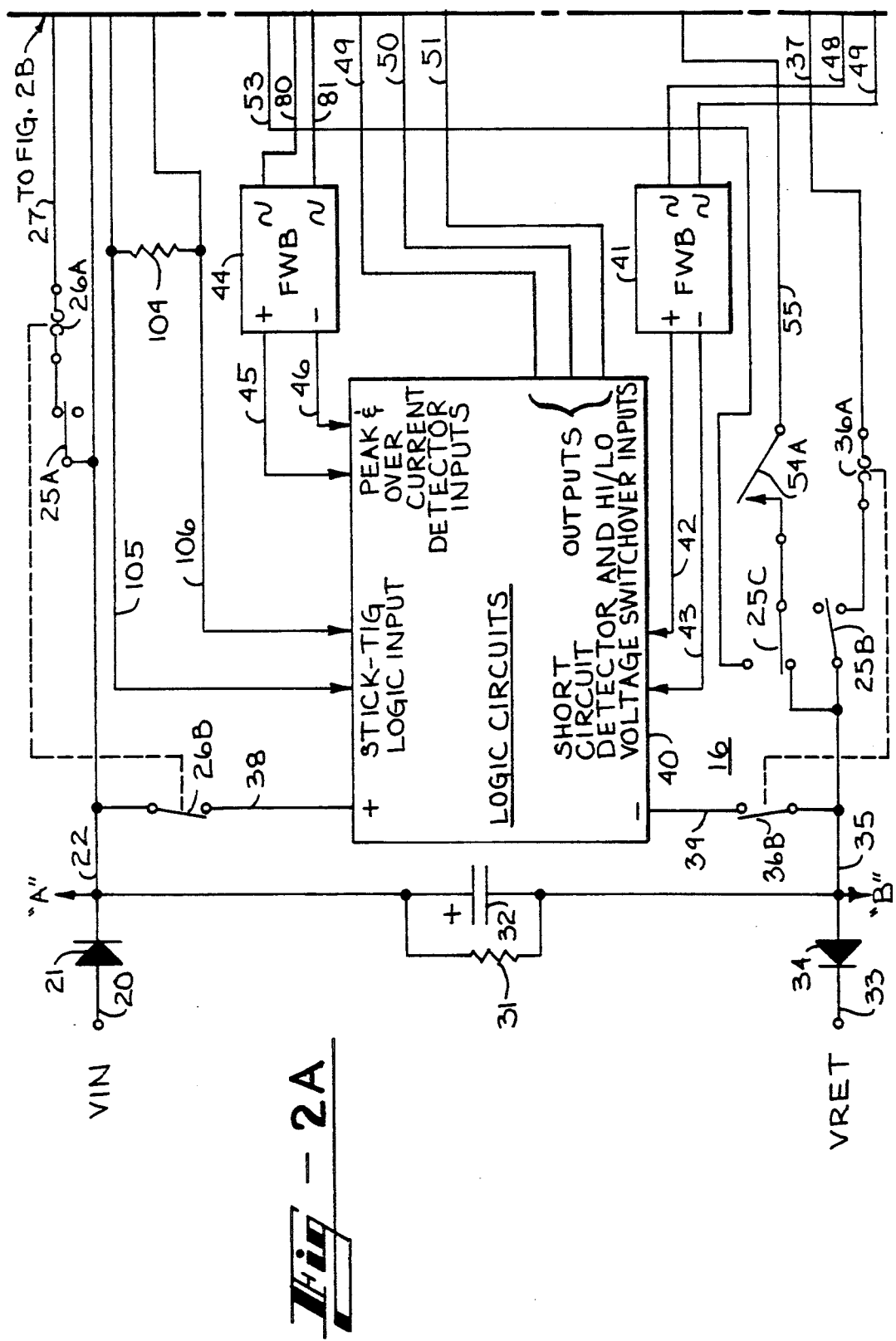

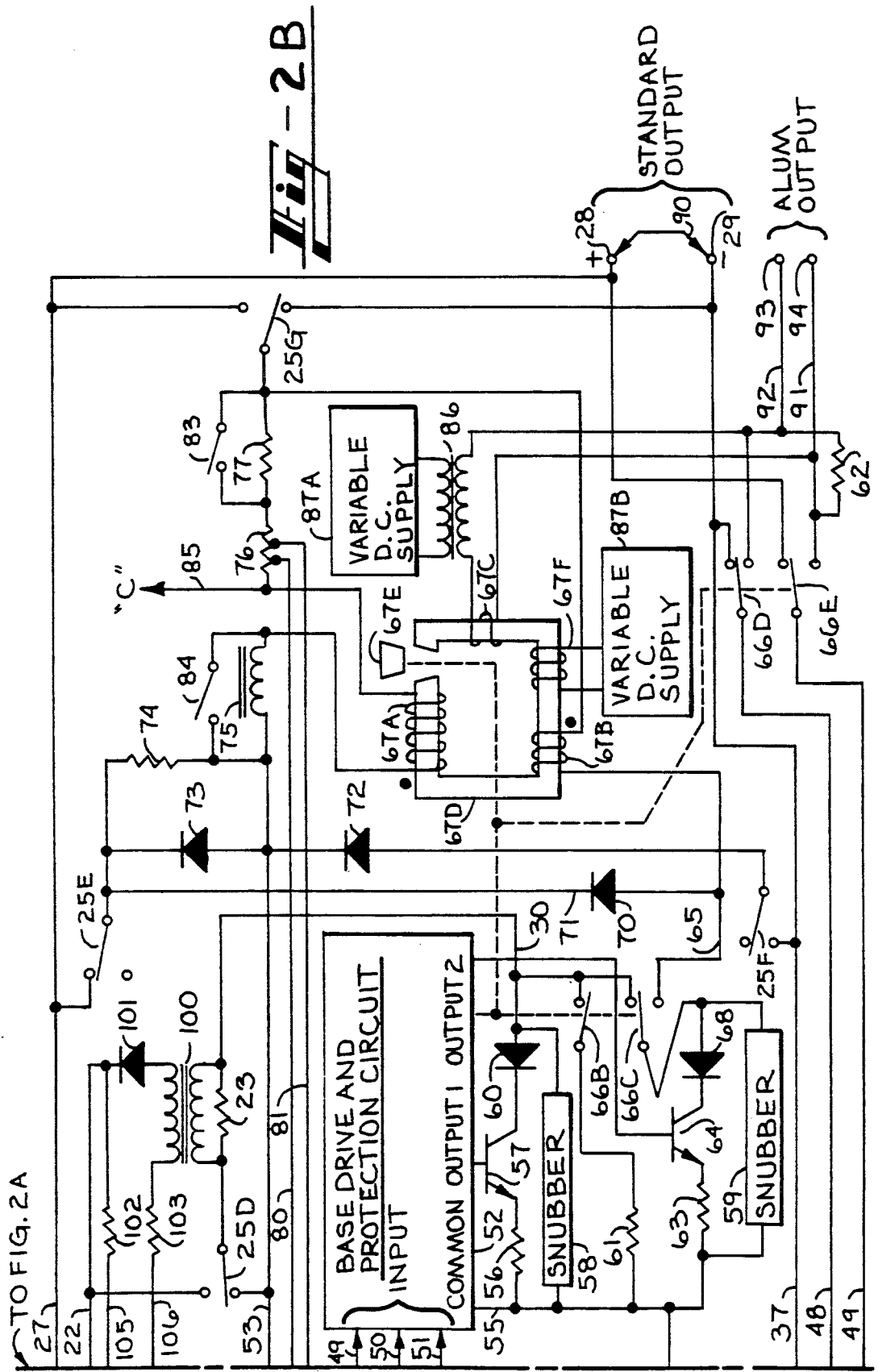

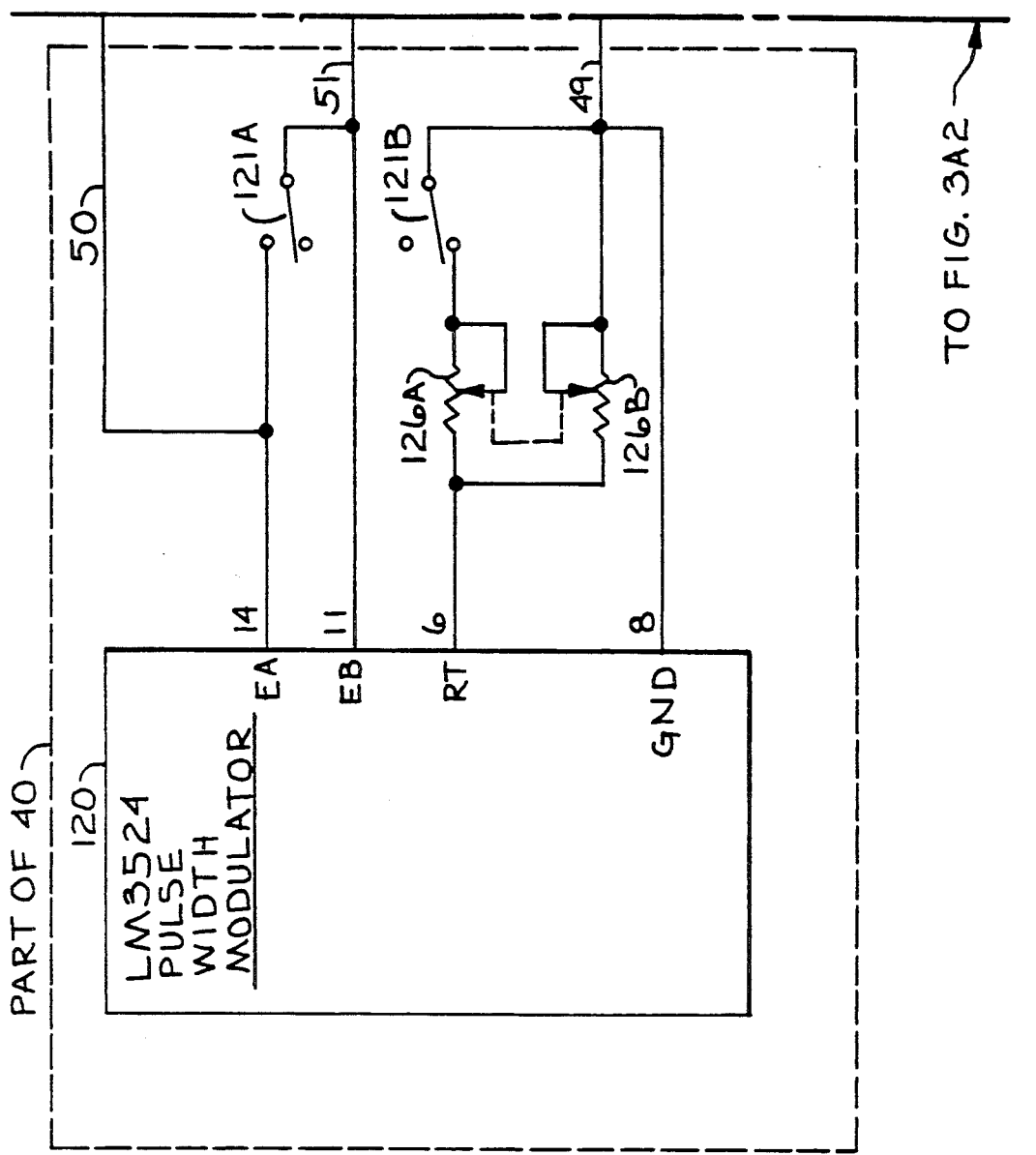
Fig-3A1

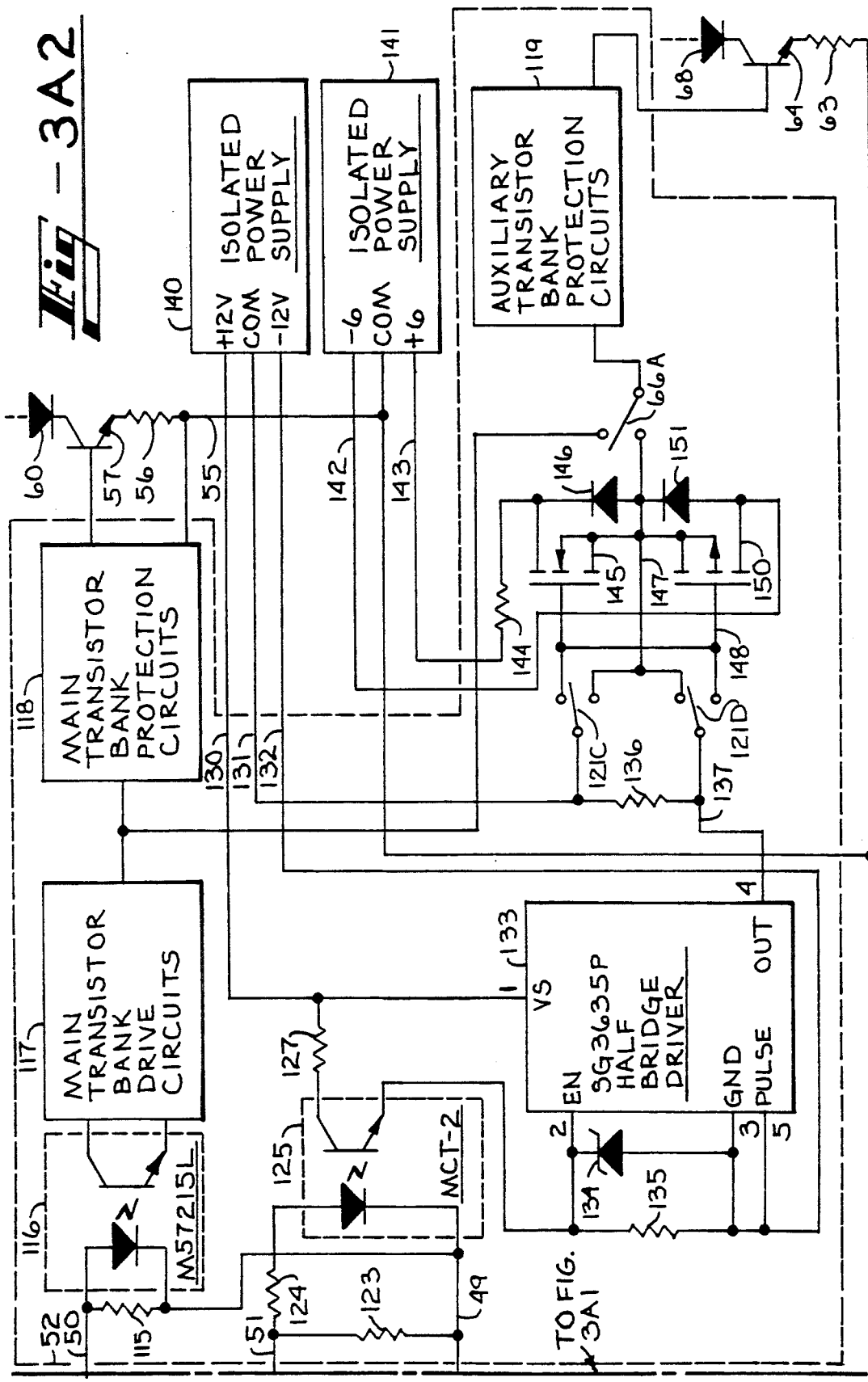
Fig-3A2

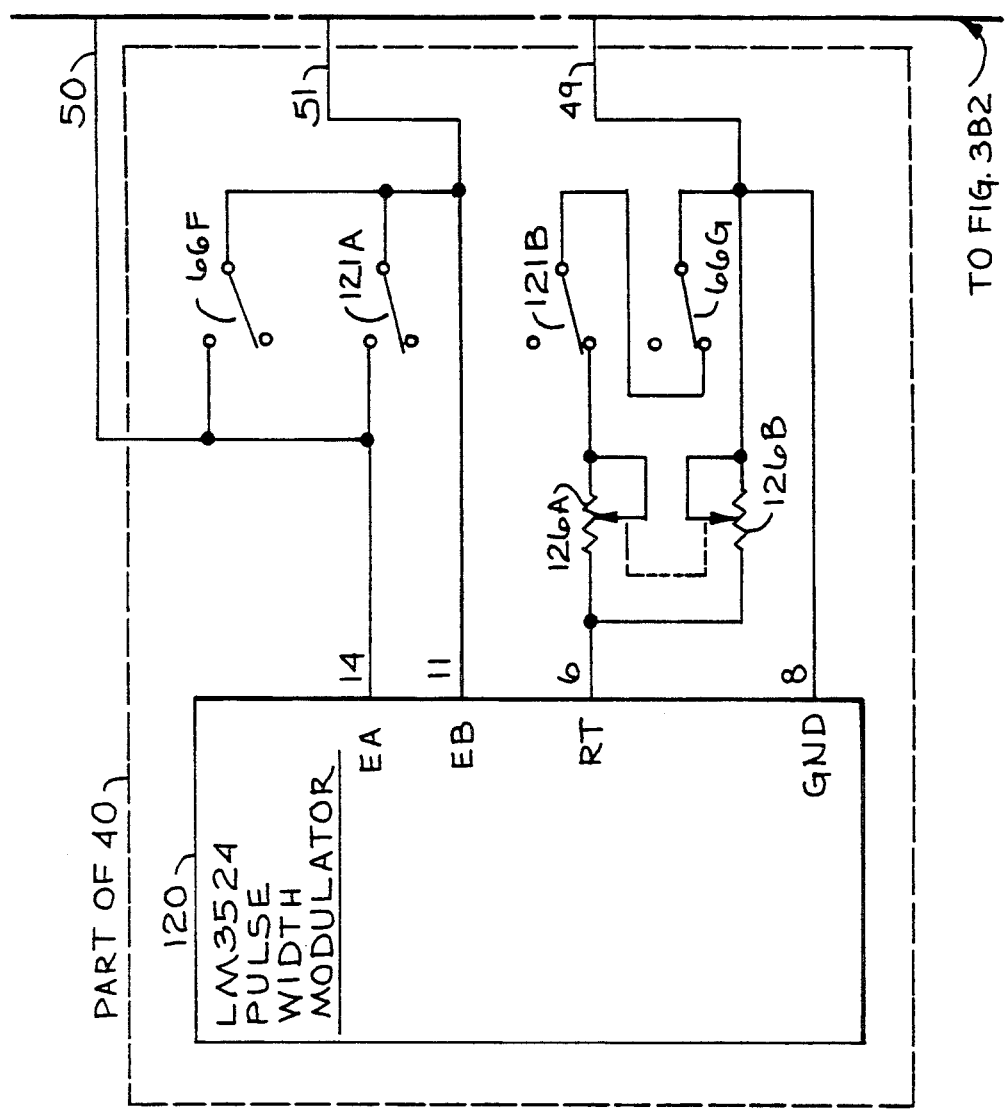
Fig-3B1

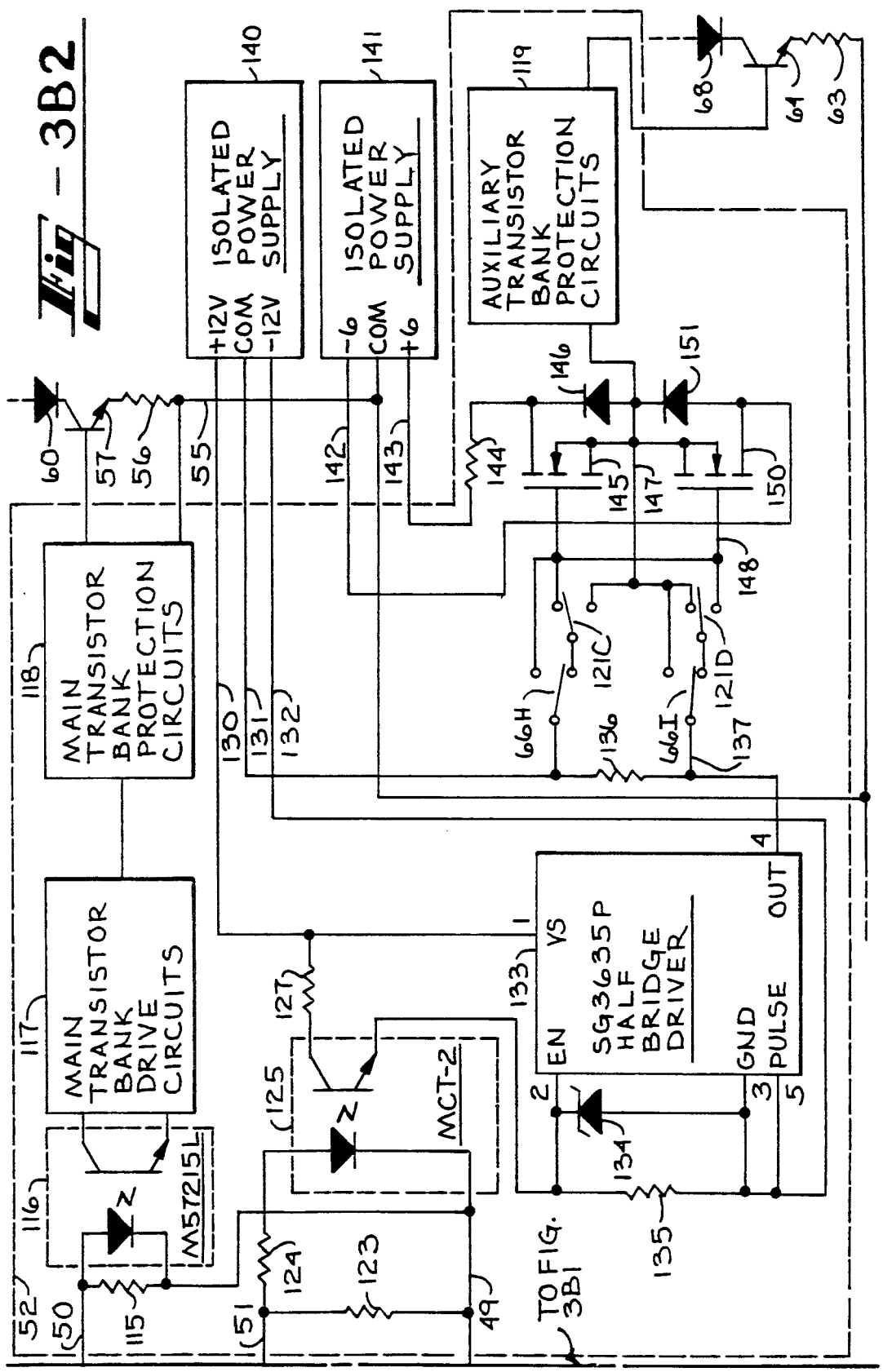

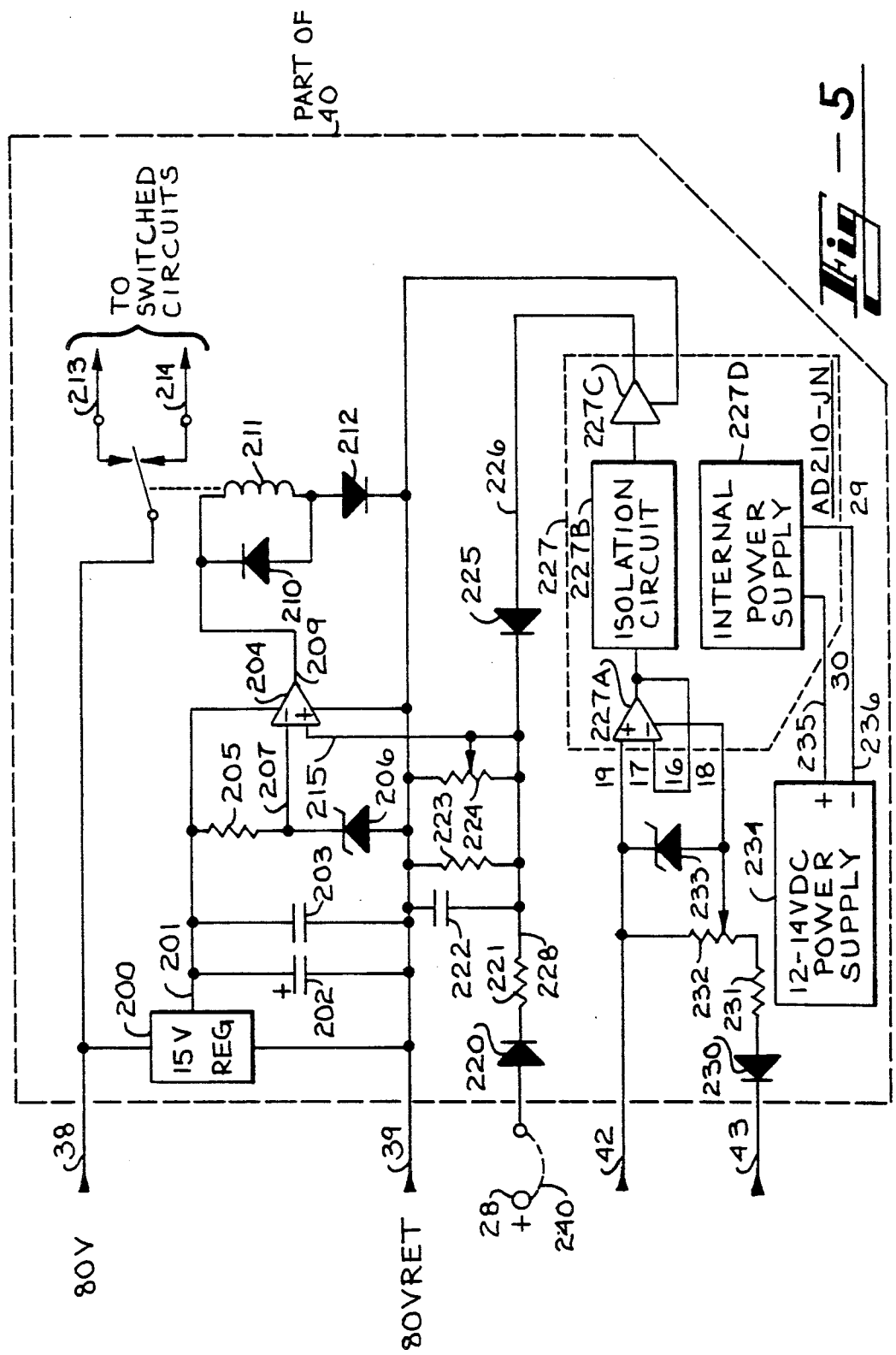

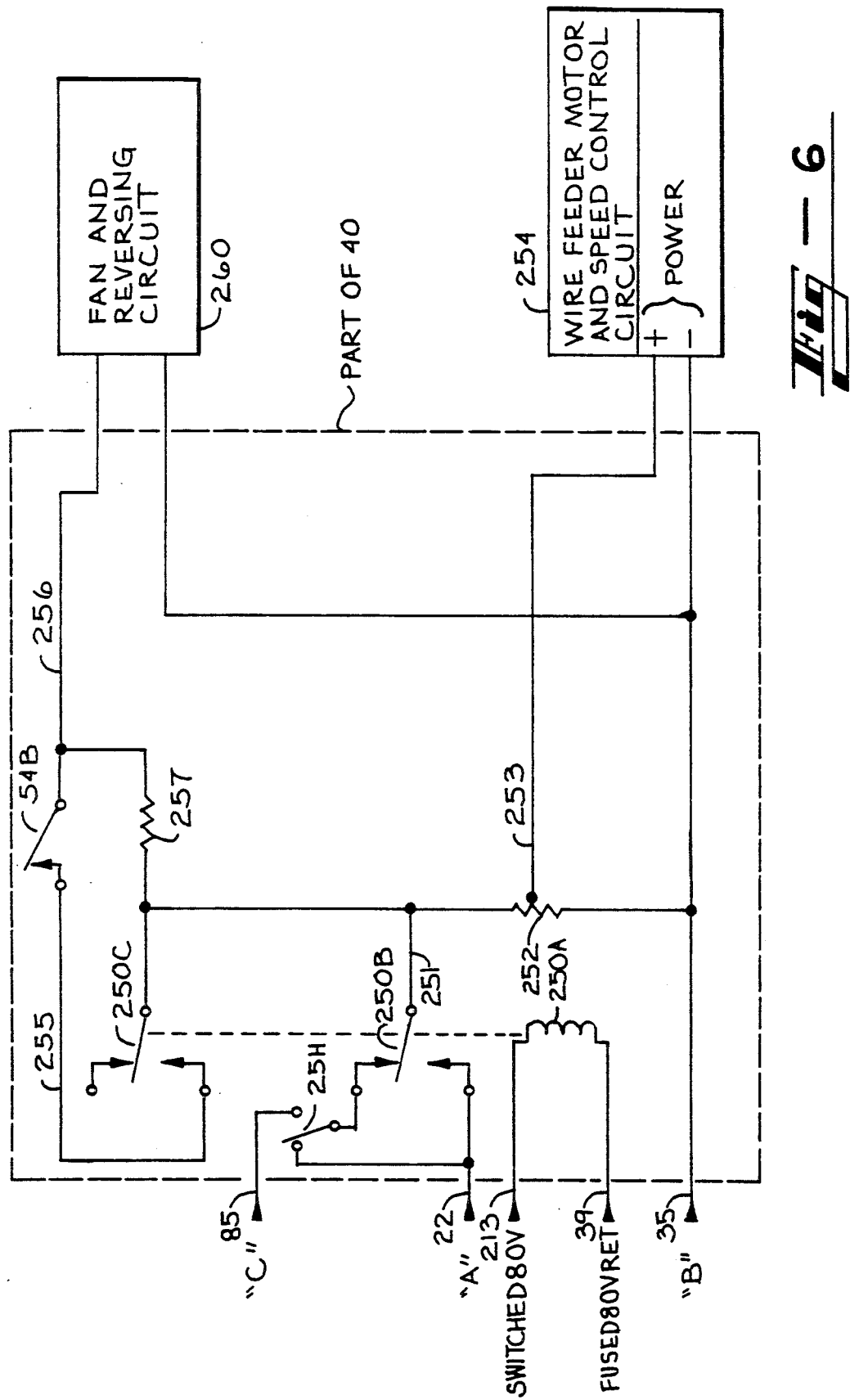

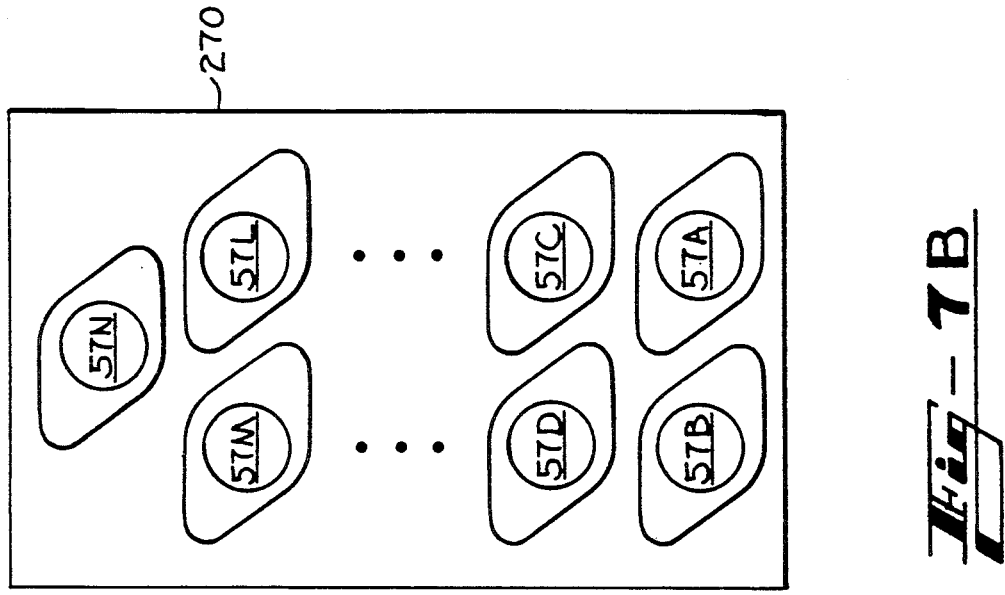
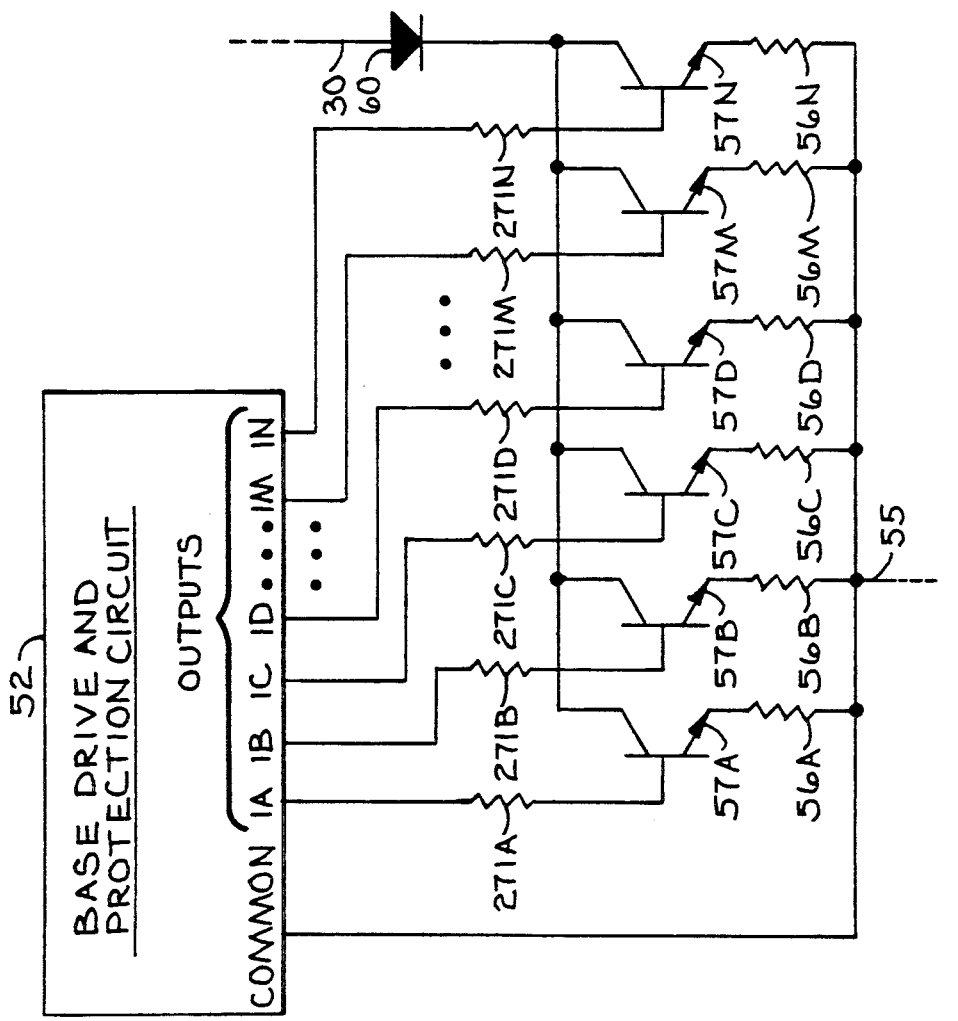
Fig-7B
Fig-7A

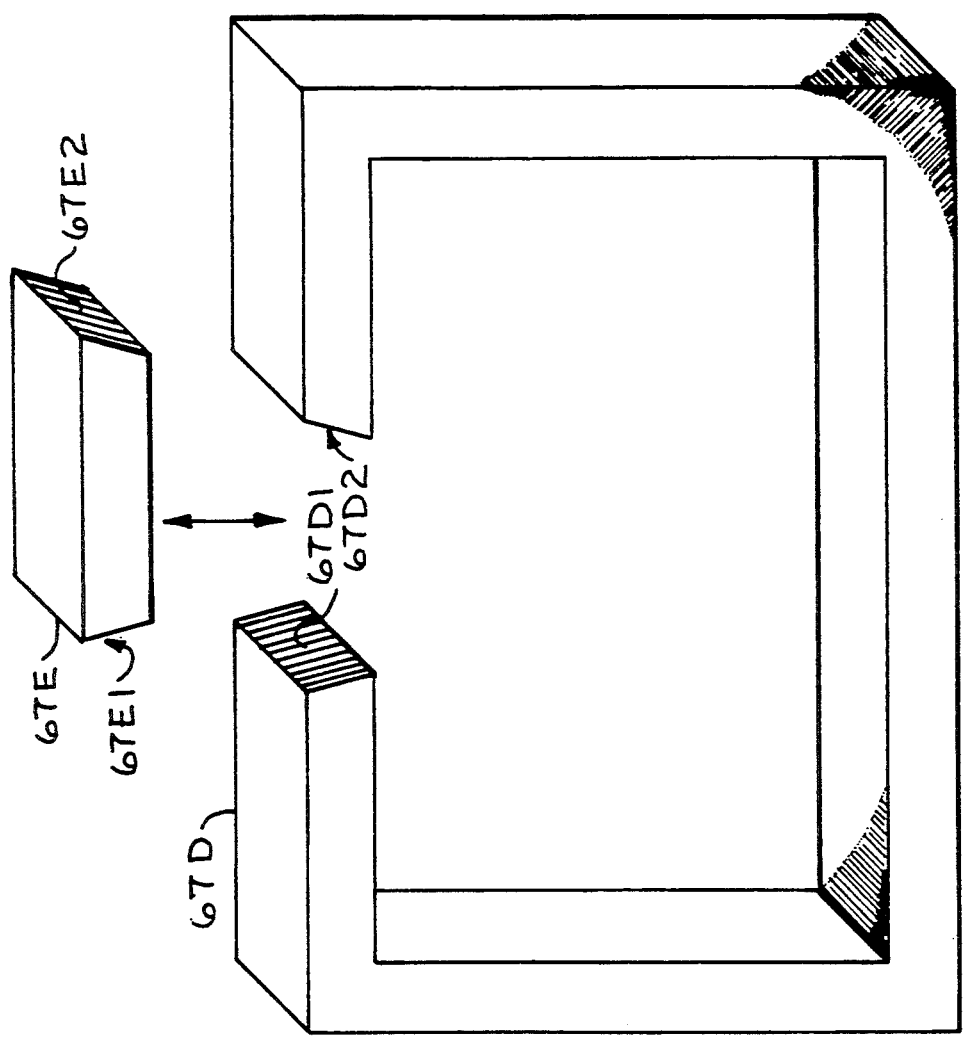
Fig — 10
NOTE: 67D1, 67D2, 67E1 AND 67E2 ARE MACHINED SURFACES.

TRANSISTOR FAILURE SELECTION CIRCUIT AND STRUCTURE FOR EASE OF MAINTENANCE OF A WELDING STATION

This is a continuation application of application Ser. No. 612,814 filed Nov. 14, 1990, now pending which is a divisional application of U.S. patent application Ser. No. 374,465, filed Jun. 30, 1989, by Malcolm T. Gilliland, entitled "Electronic Welding Station with AC and Reversible Polarity DC Outputs", now U.S. Pat. No. 5,025,127.

TECHNICAL FIELD

The present invention relates to electronic welding stations and, in particular, to an electronic welding station which can provide an AC output and a reversible polarity DC output.

BACKGROUND OF THE INVENTION

Electronic welding stations, such as those disclosed in U.S. Pat. Nos. 4,301,355 to Kimbrough et al., 4,349,720 to Makimaa, 4,409,465 to Yamamoto et al., 4,427,874 to Tabata et al., and 4,716,274 to Gilliland, generally have two output terminals, one of which is a direct connection to the DC power supply, and the other of which is connected to the power supply through a switching transistor and other components. Generally, the welding torch is connected to the switched output terminal. If only a single welding station is being used or if each welding station of a multitude of welding stations has an independent power supply then the polarity of the welding torch, with respect to the workpiece, can be selected by connection of the welding torch connector to, as desired, the positive output terminal or the negative output terminal of the welding station, and by connection of the workpiece to the other output terminal. However, when multiple welding stations are operated from a central power supply, such as disclosed in U.S. Pat. No. 4,716,274, simple reversal of the welding torch and workpiece connections on all of the welding stations will not achieve the desired result because the workpieces, which are generally interconnected, are connected to the switched output terminals. The result is that the switched output terminals are all operating in parallel and the desired control over the welding operation cannot be achieved. Therefore, there is a need for an electronic welding station which can be configured so that a selected one of the welding torch and the workpiece can be directly connected to the central power supply and the other connected via the switching transistor.

Electronic welding stations, such as those described in the above mentioned U.S. patents, generally provide a unipolar output. That is, the output of the electronic welding station is DC or pulsed DC and is always of the same polarity. These electronic welding stations do not provide an AC output. However, an AC output is desirable, especially for aluminum-TIG (tungsten inert gas) welding. Therefore, there is a need for an electronic welding station which can provide an AC output.

AC welding stations have been designed but it has been necessary to have both a conventional DC welding station, with its DC output, and an AC welding station, so that aluminum-TIG welding can be performed. This doubles the number of welding stations, which greatly increases the total cost and complicates maintenance and logistics. Therefore, there is a need for an electronic welding station which can provide either a DC output or an AC output, as selected.

In an electronic welding station which can perform both DC and AC welding operations it is desired to maximize the number of components that are used for both DC operations and AC operations and to minimize the number of components, especially larger and/or more expensive components, that are used for only one mode of operation. It is therefore desirable to be able to use the output inductor in a DC output welding station, for the transformer in an AC output welding station. However, the open construction of a typical inductor core generally provides insufficient coupling for use as a transformer and the closed construction of a typical transformer core provides too high an inductance for use in most DC-output welding operations. Therefore, there is a need for a component which can be selectively configured to operate as either an inductor or as a transformer, as required for the particular operation to be performed.

In conventional DC output electronic welding stations, the switching transistor is either in an on state wherein the full power supply voltage is applied to the switched output terminal, or in an off state wherein the power supply is isolated from the switched terminal. In these welding stations, the welding current is controlled by varying the pulsewidth (the on time of the switching transistor). However, this technique is generally not applicable to AC output welding stations since changing the pulsewidth for one polarity of the output waveform causes an opposite change in the pulsewidth of the other polarity of the output waveform. Therefore, the full power supply voltage, of one polarity or the other, would always be applied to the output terminal. Therefore, there is a need for a method for controlling the welding current of an AC output electronic welding station.

Electronic welding stations, in order to reduce manufacturing and maintenance costs, generally use a bank of switching transistors, rather than a single switching transistor. Some of the transistors will be easily accessible and, in the event of failure, can be easily replaced. However, some transistors will not be as accessible and, in order that replacement may be accomplished, the entire bank of switching transistors may have to be removed and/or other components or circuits of the electronic welder may have to be removed. In the latter case, a substantial amount of time may be required to replace the defective transistor, thus increasing the maintenance costs, and the removal of components other than the one which is to be replaced provides an increased occasion for misassembly and subsequent destruction of the electronic welder. Therefore, it is highly desirable to design an electronic welding station so that a transistor which fails is preferably a transistor which is easily replaced.

For a specified weld type, gas type, gas flow rate, welding rod material and diameter, torch travel speed, and work material type and thickness, there will be a range of values for the pulse frequency, a range of values for the pulsewidth, and a range of values for the wire feed speed that will produce an acceptable weld. Of course, for cost and efficiency reasons, it is desirable to perform a welding operation as rapidly as is possible while still producing a quality weld. To achieve this, wire feed speed and arc current should generally be at the high end of the allowable range of values, subject, of course, to adjustment based upon the skill of the individual welder. Some electronic welding stations have a plurality of accessible controls so that the wire feed speed, the pulse frequency, the pulsewidth (and the arc current), etc., can be individually varied. Other electronic welding stations try to sense the arc current of the arc voltage and adjust the wire feed speed and other parameters so as to maintain a constant arc current or arc voltage or respond to the arc current or arc voltage. However, the first type of electronic welding station cannot be rapidly adjusted because the operator may have three to five knobs to reposition while trying to obtain the desired arc. The second type of electronic welding station frequently produces less than desirable results because some of the parameters are not a precise function or a linear function of the arc current, the arc voltage, any particular individual factor, or any particular group of factors. Therefore, there is a need for an electronic welding station which minimizes the number of parameters that the operator has to select and which adjusts other dependent parameters so as to produce an optimum weld in light of the parameters selected by the operator.

It is desirable to monitor the arc voltage to determine whether the arc has been struck so as to allow the electronic welding station to use one set of parameters which are desirable for striking an arc and to use another set of parameters which are desirable for conducting the welding operation. Therefore, it is desirable to provide an arc detection circuit which operates with electronic welding stations which provide both positive ground and negative ground DC outputs and AC outputs.

SUMMARY OF THE INVENTION

The present invention is an electronic welding station which overcomes the above listed disadvantages of the prior art and, furthermore, overcomes these disadvantages in a manner which minimizes the manufacturing and maintenance costs of the electronic welding station. Broadly stated, the present invention is an electronic welding station which can be selectively configured to operate with either a positive ground or a negative ground by simply setting the output polarity switch to the desired position. In the negative ground position, the negative power supply lead is connected to the negative output terminal of the welding station and the positive power supply lead is connected to the positive output terminal of the welding station through a bank of switching transistor and one or more inductors and resistors. In the positive ground position, the positive power supply lead is directly connected to the positive output terminal of the welding station and the negative power supply lead is connected through the same bank of switching transistors, inductors and resistors to the negative output terminal. A switching system changes the interconnections between the bank of switching transistors, inductors and resistors, power supply leads, and output terminals, so that the most or all of same components are used regardless of whether positive ground or negative ground operation is selected.

Therefore, one object of the present invention is to provide an electronic welding station which can selectively operate in either a positive ground or a negative ground configuration.

It is another object of the present invention to provide an electronic welding station which uses the same components for positive ground operation and negative ground operation.

The present invention also provides an electronic welding station which provides an AC output for aluminum-TIG welding. The present invention includes a device for controlling the frequency of the AC output and for controlling the duration of the pulse on one polarity of the AC cycle as compared to the duration of the pulse on the other polarity of the AC cycle so that square wave and asymmetrical wave outputs can be selected. To minimize construction and maintenance costs, the electronic welding station described by the present invention uses most of the same components that are required for an electronic welder having only a DC output and minimizes the number of additional components that are required.

Therefore, it is an object of the present invention to provide an electronic welding station which provides both AC and DC outputs.

It is another object of the present invention to provide an electronic welding station, having both AC and DC outputs, which uses the same components to provide the AC output and the DC output.

The present invention also includes a novel arrangement whereby an iron core, having several windings, is used as an inductor for DC operation by the removal of a section of the core, and is used as a transformer for AC operation by insertion of the section into the core. When the section is removed, a substantial air gap is introduced into the core. This reduces the coupling between the windings on the core and also reduces the inductance of each of the windings so that one of the windings can be used to provide the relatively small inductance required for DC operation. When the section is reinserted into the core, the air gap is eliminated, thereby increasing the inductance of each of the windings and substantially increasing the coupling between the windings so that the device can now be used as a transformer for AC output operation.

Therefore, it is an object of the present invention to provide a device which can be used as an inductor for DC output operation and as a transformer for AC output operation.

It is a further object of the present invention to provide a device which can be configured to operate as an inductor or as a transformer by the removal or insertion of a section of the core of the device.

In DC output operation, the output current can be controlled by varying the on time and the off time of the transistors in the switching bank. This is not effective for some types of AC output operation because reducing the duration of one polarity of the AC output waveform simply increases the duration of the other polarity of the AC output waveform. In the present invention, the output power or current in AC output operation is varied by adjusting the degree of saturation of the output transformer, the reactance of a variable reactor connected in series with the output, or both. A higher degree of saturation for the output transformer and a higher reactance for the variable reactor both result in less welding current, whereas a lower degree of saturation for the output transformer and a lower reactance for the variable reactor both result in more welding current. In the present invention, the reactance of the output transformer or the variable reactor is varied by controlling the degree of saturation of the core of the output transformer or the variable reactor. One or more variable DC power supplies control the degree of saturation of the output transformer or the variable reactor. If more saturation (less reactance) is desired, the output of the variable DC power supply is increased. If less saturation (more reactance) is desired, the output of the DC power supply is decreased.

Therefore, it is an object of the present invention to provide a means for controlling the welding current in an AC output operation by varying the degree of saturation, and therefore the coupling, of the output transformer.

It is a further object of the present invention to provide a means for controlling the welding current in an AC output operation by means of a variable reactor.

It is a further object of the present invention to control the degree of saturation of the core of an output transformer or a variable reactor by use of a variable DC power supply.

The present invention also provides an electronic welding station with reduced maintenance costs. The biasing circuitry for one transistor is slightly different from the biasing circuitry for the rest of the transistors in the switching bank so that this transistor tends to move out of saturation or near saturation before any of the other transistors. When a welding condition occurs which tends to cause an excessive current to flow through the transistors, this transistor will heat up more rapidly than any of the rest of the transistors. This tends to cause the failure of this transistor in preference to the failure of the remaining transistors. Because of protection circuitry in the electronic welding station, the failure of the preferential transistor removes the drive power from the remaining transistors so that they are protected. In the present invention, the preferential transistor is mounted in the electronic welding station in a position where it is readily accessible for removal and replacement. This results in a substantial savings in maintenance costs because it is not necessary to remove and replace other components in order to obtain access to this transistor.

Therefore, it is an object of the present invention to reduce maintenance costs by mounting one of the transistors in the switching bank in a position which is readily accessible and biasing this transistor so that it fails in preference to any of the other transistors in the switching bank.

It is another object of the present invention to provide an apparatus which causes one transistor to fail in preference to other transistors which are connected in parallel.

The present invention also provides a method and an apparatus for optimizing a welding operation. The method contemplates selecting an independent parameter, recording the values for this independent parameter and corresponding values for a set of other parameters which produce optimum welding results, and providing a control system which varies these other parameters as a function of the selected parameter so that the operator need only adjust a single parameter control. One embodiment of the present invention provides an apparatus which has a plurality of ganged potentiometers, the tapers and tap points of these potentiometers being designed so that the parameters which they control track the selected parameter so as to produce optimum welding results. Another embodiment of the present invention contemplates a multi-position switch which selects a desired value for the selected parameter, a memory which has optimum values for the other parameters given the selected value for the selected parameter, and a processor which adjusts the parameters in accordance with the values stored in the table in the memory. The method and apparatus disclosed serve to reduce the number of controls that the operator must adjust. This results in a higher efficiency for the operator and better welding results.

Therefore, it is an object of the present invention to improve the operator's efficiency and improve the quality of the weld by reducing the number of parameters that the operator must select.

Since different types of welding operations, different types and thicknesses of materials, different shielding gases, etc., affect the interdependence between the various parameters, the present invention provides a plurality of modules. Each module is designed for a particular type of welding operation. Therefore, the parameter values used for a particular welding operation will be the optimum parameters for that type of welding operation and need not be a compromise between the values for several different welding operations. In one embodiment, each module contains a different set of ganged potentiometers, the potentiometers having the tapers and taps necessary to achieve the desired results for a specified type of welding operation. In another embodiment, each module contains a memory which has a table of the optimum values for the various parameters. The use of modules allows the optimum welding parameters for a plurality of different welding operations to be selected by the use of a single parameter selection control.

Therefore, it is an objection of the present invention to provide an electronic welding station which utilizes a plurality of modules to achieve optimum welding results for a plurality of different welding operations, each module varying the parameters as necessary to achieve optimum welding results for a specified type of welding operation.

The presence or absence of the arc can be determined by monitoring the output voltage. Depending upon the operating mode selected, the output voltage may be positive, negative, or AC with respect to the workpiece. The present invention provides an arc detector circuit which monitors the absolute value of the output voltage. The circuit considers the arc to have been struck when the absolute value of the output voltage drops below a predetermined reference value. Furthermore, the present invention provides an arc detection circuit which maintains compatibility with the welding stations described in U.S. Pat. No. 4,716,274.

Therefore, it is an object of the present invention to provide an arc detection circuit which functions for positive ground, negative ground, and AC output modes of operation.

It is another object of the present invention to provide an arc detection circuit which, in addition to being usable with positive ground, negative ground, and AC output modes of operation, is also compatible with previously existing equipment.

That the present invention accomplishes these objectives and overcomes the drawbacks of the prior art will be apparent from the detailed description of the preferred embodiment below.

BRIEF DESCRIPTION OF THE DRAWING

FIGS. 2A and 2B are diagrams of the preferred embodiment of an electronic welding station 16 which uses the present invention.

FIGS. 3A1, 3A2, 3B1, and 3B2 are diagrams of two embodiments of the base drive and protection circuit.

FIG. 5 is a schematic diagram of the high/low voltage switchover circuit.

FIG. 6 is a schematic diagram of the fan speed control and wire feed speed control circuits.

FIG. 7A is a schematic diagram of the transistor failure selection circuit of the present invention.

FIG. 7B is an illustration of a typical environment in which the present invention is used.

FIG. 10 is an illustration of the core of the inductor/transformer used in the preferred embodiment.

DETAILED DESCRIPTION

Figure 1:
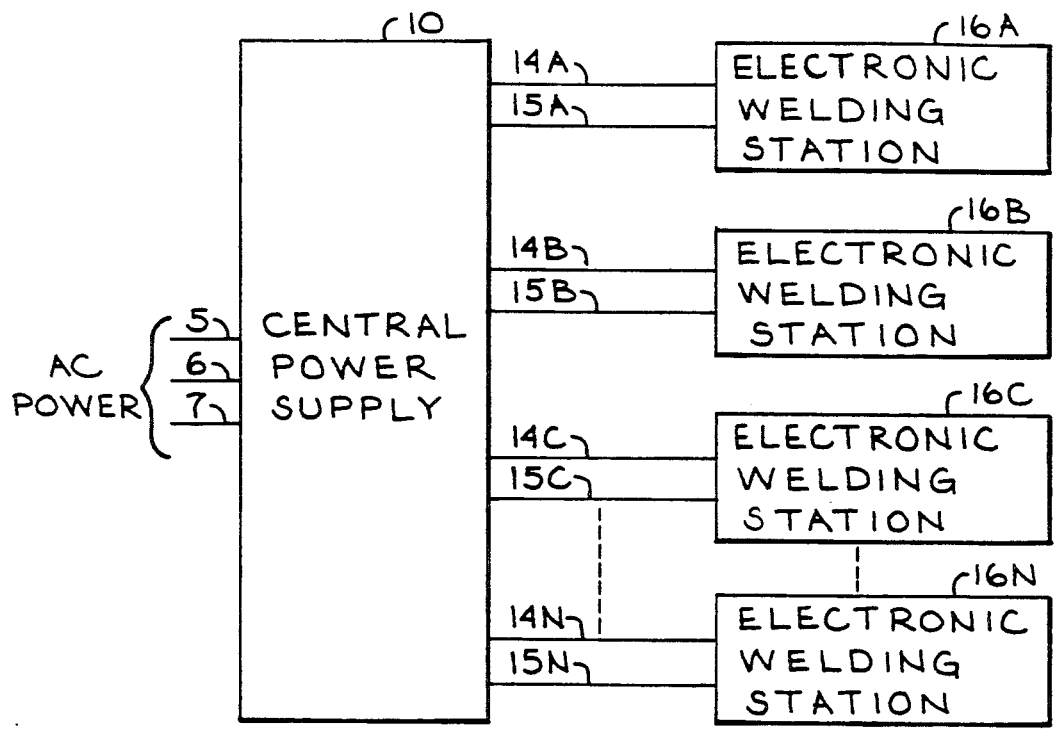
FIG. 1 is an illustration of the preferred environment of the preferred embodiment of the present invention.

Turn now to the drawing, in which like numerals reference like components throughout the several figures. FIG. 1 is an illustration of the preferred environment of the preferred embodiment of the present invention. A central welding power supply 10 provides power for a number of electronic welding stations 16A-16N. The central welding power supply 10 may provide an AC output or a DC output. The electronic welding stations 16A-16N will operate from both AC and DC power input voltages. Central power supply 10 is connected to a source of three-phase AC power (not shown), normally having a voltage of either 230 or 460 volts, by conductors 5, 6, and 7. In the preferred embodiment, the central power supply 10 provides an output of approximately 80 volts DC at a current sufficient to power the desired number of electronic welding stations 16. Methods of construction of central power supply 10 are well known to those skilled in the art. Electronic welding stations 16A-16N are connected by conductors 14A-14N and 15A-15N to central power supply 10. Each electronic welding station 16 can accept an input voltage of 30 to 150 volts (80 volts nominal) and has its own controls for varying the arc characteristics and wire feed speed. This allows a welding operator using an electronic welding station 16A to adjust the arc characteristics to match the type of welding that is being performed without affecting the arc characteristics of the other electronic welding stations 16B-16N.

FIG. 2 is a diagram of the preferred embodiment of an electronic welding station 16 which uses the present invention. The present invention represents an improvement to electronic welding stations in general and, in particular, to the electronic welding stations described in U.S. Pat. No. 4,716,274, issued Dec. 29, 1987, entitled "Distributed Station Welding System", U.S. patent application Ser. No. 062,543, filed Jun. 12, 1987, entitled "Improved Arc Welding System", and U.S. patent application Ser. No. 181,985, filed Apr. 15, 1988, entitled "Arc Welder With Improved Arc Striking Capability", the inventor of all of which is Malcolm T. Gilliland, and all of which are hereby incorporated herein by reference as if fully set forth herein.

VIN conductor 20 and VRET conductor 33 are preferably connected t the positive and negative outputs, respectively, of the central DC power supply 10 which powers one or more of the electronic welding stations. Although it is preferred that central power supply 10 have a DC power output, it is permissible for central power supply 10 to have an AC power output since diodes 21 and 34 provide halfwave rectification. Of course, if the output of central power supply 10 is an AC power output then it may be necessary to make capacitor 32 larger than that which would be required if central power supply 10 had a DC power output.

VIN conductor 20 is connected to the anode of diode 21. The cathode of diode 21 is connected by positive bus 22 to one end of a bleeder resistor 31, the positive terminal of filter capacitor 32, one pole of switch 26B, the pole of switch 25A, the normally open contact of switch 25D, one end of a 100 ohm resistor 102, the cathode of diode 101, and, through switch 26B and conductor 38, to the positive power input of logic circuits 40. Switch 25 is an eight-pole, double-throw switch which allows the user to place the electronic welding station 16 in either a positive ground or a negative ground mode of operation. Switch 25 (switch sections 25A-25H) is shown in the positive ground position. For convenience, switch contacts will be referred to as normally open or normally closed with respect to the positive ground switch position. The normally closed contact of switch 25A is connected through circuit breaker 26A to positive output bus 27. Circuit breaker 26A and switch 26B are embodied in a double pole circuit breaker, or a circuit breaker with an auxiliary contact (switch). Circuit breaker 26A should be rated at approximately 100 amps. Positive output bus 27 is connected to the positive output terminal 28 of the standard output of the electronic welding station 16, the normally closed contact of switch 25E, the normally open contact of switch 25G, and the normally closed contact of switch 66E.

VRET conductor 33 is connected to the negative power output of central power supply 10 and the cathode of diode 34. The anode of diode 34 is connected by negative bus 35 to the other end of resistor 31, the other end of capacitor 32, the pole of switch 25B, the normally closed contact of switch 25C and, through switch 36B and conductor 39, to the negative power input of logic circuits 40. The normally open contact of switch 25B is connected to negative output bus 37 through circuit breaker 36A. Negative output bus 37 is connected to negative output terminal 29 of the standard output of the electronic welder. Circuit breaker 36A and switch 36B are also embodied in a double pole circuit breaker. Negative output bus 37 is also connected to the normally open contact of switch 25F, the normally closed contact of switch 25G, and the normally closed contact of switch 66D.

Circuit breakers 26 and 36 operate to shut down the welding station, including the logic circuit, in the event of an overcurrent condition or an incorrect connection of the welding station to the central power supply. This helps to limit the degree of any damage.

Consider now the operation of the circuit described thus far. With switch 25 in the position shown, which configures the electronic welder for positive ground operation, positive output terminal 28 is connected directly to positive output bus 22. Negative output terminal 29 is connected to the negative output bus 35 through the switching transistors 57 and 64, output inductors 67 and 75, and output resistors 76 and 77. Therefore, in the positive ground configuration, the negative output terminal is the switched terminal and the positive output terminal is the reference terminal. However, if switch 25 is thrown to its opposite position, which configures the electronic welding station for negative ground operation, negative output terminal 29 will be directly connected to negative output bus 35 and positive output terminal 28 will be connected to positive output bus 22 through switching transistors 57 and 64, output inductors 67 and 75, and output resistors 76 and 77. Therefore, in the negative ground configuration, the positive output terminal is the switched output terminal and the negative output terminal is the reference terminal.

In positive ground operation, positive output terminal 28 is connected to the workpiece (not shown) and negative output terminal 29 is connected to the welding torch (not shown). Conversely, in negative ground operation, positive output terminal 28 is connected to the welding torch and negative output terminal 29 is connected to the workpiece. In either situation, it will be noted that the workpiece is connected to a terminal which has direct access to a power supply bus (22 or 35) and the welding torch is connected to the other bus (35 or 22) through the switching transistors 57 and 64. Therefore, regardless of whether positive ground or negative ground operation is selected, the welding torch is always connected to the switched output of the welding station. This allows a multiplicity of units, all configured for either the positive ground mode or the negative ground mode, to operate from a central power supply 10 and on a common workpiece without the operation of one welding station affecting the operation of another welding station through the conductive path provided by the workpiece.

From the above and an inspection of FIG. 2, it will be appreciated that transistors 57 and 64 are used in a common emitter (inverting) configuration for positive ground operation and in an emitter follower (not-inverting) configuration for negative ground operation. This arises from the use of NPN transistors and the opposite situation would occur with PNP transistors. It will be appreciated that N-channel and P-channel FETs may be used instead of bipolar transistors.

Parameter selection and logic circuits 40 comprise the circuits for input voltage sensing, pulse frequency and width selection, chopper frequency and duty selection, arc detection, output current sensing, pulsewidth modulation, peak current and overcurrent detection, short circuit detection, isolation, etc., all as described in the above patent and the above patent applications. The output of logic circuits 40 is connected by conductors 49, 50 and 51 to the input of base drive and protection circuit 52. Circuit 52 has isolation circuits, drivers, crowbar circuits and fuses, etc., again as described in the above patent and the above patent applications, and also contains additional circuitry so as to provide two outputs. The first output is connected to the base of transistor 57. The emitter of transistor 57 is connected through resistor 56 to common bus 55. Transistor 57 and resistor 56 represent a plurality of parallel connected transistor and resistor pairs, such as shown in FIG. 7 and in the above patent and the above patent applications. However, for simplicity of illustration, a single transistor and a single resistor are shown. The collector of transistor 57 is connected to the cathode of diode 60. The anode of diode 60 is connected by conductor 30 to the normally closed contacts of switches 66B and 66C, one end of a snubber 58, one end of a shunt resistor 23, and one end of the primary winding of a pulse transformer 100. The other end of the primary winding of transformer 100 and the other end of resistor 23 are connected to the pole of switch 25D.

The second output of circuit 52 is connected to the base of transistor 64. The emitter of transistor 64 is connected to emitter bus 55 through an emitter resistor 63. The collector of transistor 64 is connected to the cathode of diode 68. The anode of diode 68 is connected to one end of snubber 59 and the pole of switch 66C. The normally closed contact of switch 66C is connected to conductor 30. The normally open contact of switch 66C is connected by conductor 65 to one end of primary winding 67B and the anode of freewheeling diode 70. The other end of winding 67B is connected to the pole of switch 25G. Transistor 64 and resistor 63 also represent a plurality of parallel connected transistor and resistor pairs. Again, for simplicity of illustration, a single transistor and a single resistor are shown.

In the preferred embodiment, nine transistors/resistor pairs are used: six for transistor 57 and resistor 56, and three for transistor 64 and resistor 63. Also, snubber 58 represents two parallel circuits and snubber 59 represents one circuit. Each snubber circuit is a conventional snubber circuit and comprises a parallel circuit of a resistor and a diode, connected in series with a capacitor. Transistors 57 and 64 and snubbers 58 and 59 are connected in parallel for positive ground and negative ground operation. However, for AC output operation, transistors 57 and 64 are connected in a push-pull arrangement with transformer 67. The use of six transistors for transistor 57 and three transistors for transistor 64 is somewhat arbitrary. In the preferred embodiment, each snubber circuit was designed to protect three transistors so the use of two snubbers and six transistors in one branch and the use of one snubber and three transistors in another branch is for convenience. It has been found that the use of two transistors for transistor 64 is quite satisfactory.

The pole of switch 66B is connected through shunt resistor 61 to emitter bus 55. Resistor 61 serves as an arc sustaining resistor in the DC output modes during the period when switching transistors 57 and 64 are turned off. Emitter bus 55 is connected to the other end of snubbers 58 and 59, the common reference of base drive and protection circuit 52, and the pole of switch 54A. The normally open contact of switch 54A is connected to the pole of switch 25C. Switch 54 is representative of the combination of a trigger switch, generally on the torch, and a high current relay, such as are illustrated in the above patent and the above patent applications but which, for simplicity, are illustrated here as simply a switch 54. The normally closed contact of switch 25D is connected by conductor 53 to the normally open contact of switch 25C, the anode of freewheeling diode 73, the cathode of freewheeling diode 72, one end of load resistor 74, and one end of output inductor 75. The cathode of diode 73 and the other end of resistor 74 are connected by conductor 71 to the pole of switch 25E and to the cathode of freewheeling diode 70. The anode of diode 72 is connected to the pole of switch 25F. The other end of output inductor 75 is connected to primary winding 67A of inductor/transformer 67. The other end of winding 67A is connected to the pole of switch 25G through the series combination of the first output resistor 76 and the second output resistor 77.

Freewheeling diode 70 protects transistors 57 and 64 in the positive ground mode of operation. Freewheeling diode 72 protects transistors 57 and 64 in the negative ground mode of operation. In the AC output mode of operation, freewheeling diode 70 protects transistor 57 and freewheeling diode 73 protects transistor 64.

When the electronic welding station is configured, as shown, for positive ground operation, then any current flowing into negative output terminal 29 passes through the series combination of switch 25G, resistors 76 and 77, output inductor/transformer 67 and output inductor 75, the parallel combination of shunt resistor 23 and pulse transformer 100, switching transistors 57 and 64, trigger switch 54, and switch 25C to negative bus 35. Therefore, negative output terminal 29 is the switched output terminal. Positive output terminal 28 is connected to positive bus 22 through switch 25A. Because the positive output terminal 28 is directly connected to the positive input voltage bus 20, the positive output terminals 28 of a plurality of welding stations 16 can be connected to the same workpiece without interaction. In this setup, the torch for a welding station is connected to the negative output terminal 29 and the workpiece is connected to the positive output terminal 28 of that welding station.

When the electronic welding station is configured for negative ground operation current will flow through positive bus 22, the parallel combination of shunt resistor 23 and pulse transformer 100, transistors 57 and 64, trigger switch 54, output inductor 75, output inductor/transformer 67, output resistors 76 and 77, and switch 25G to positive output terminal 28. Therefore, positive output terminal 28 is the switched output terminal. Negative output terminal 29 is connected to negative bus 35 through a switch 25B. Because the negative output terminal 29 is directly connected to the negative input voltage bus 33, the negative output terminals 29 of a plurality of welding station 16 can be connected to the same workpiece without interaction. In this setup, the torch for a welding station is connected to the positive output terminal 28 and the workpiece is connected to the negative output terminal 29 of that welding station.

The poles of switches 66D and 66E are connected by conductors 48 and 49, respectively, to the AC inputs of a fullwave bridge rectifier 41. The positive and negative outputs of bridge 41 are connected by conductors 42 and 43, respectively, to the short circuit detector and the high/low voltage switchover circuit inputs of logic circuits 40. The basic operation and function of the short circuit detector and the high/low voltage switchover circuit in the logic circuit 40 is the same as that described in the above patent and patent applications. Briefly stated, the short circuit detector removes the drive signal from transistors 57 and 64 in the event the welding rod touches the workpiece, and the high/flow voltage switchover circuit monitors the output voltage and adjusts the pulse and chopping frequencies and widths, the wire feed speed, and other parameters so as to promote the striking of the arc. However, a fullwave bridge rectifier 41 has been added so that the short circuit detector and the high/low voltage switchover circuit will function in the positive, negative and AC output modes. Switch 66 controls the inputs to rectifier 41 so that the short circuit detector may monitor either the standard outputs on terminals 28 and 29 or the aluminum-TIG outputs on terminals 93 and 94.

Resistor 76 has two tap points which are connected by conductors 80 and 81 to the inputs of a fullwave bridge rectifier 44. The positive and negative outputs of rectifier 44 are connected by conductors 45 and 46, respectively, to the inputs of the peak and overcurrent detectors in logic circuits 41. The basic design and function of the peak and overcurrent detectors in logic circuits 40 are the same as that described for the peak current detector and overcurrent detector in the above patent and above patent applications. Briefly stated, the peak current detector and the overcurrent detector remove the drive signal from transistors 57 and 64 in the event that the peak current or the average current, respectively, through transistors 57 and 64 exceeds a predetermined safe amount. The direction of the current flow through resistor 76 is dependent upon whether positive ground or negative ground operation is selected. Therefore, fullwave bridge rectifier 44 rectifies the output voltage across the two taps of resistor 76 so that the signal provided to the logic circuits 40 is independent of the direction of current flow through the output resistor 76.

Pulse transformer 100 is used for STICK-TIG operation. The construction and operation of the STICK-TIG circuit has been described in the above patent and above patent applications. It the above patent and patent applications the STICK-TIG circuit monitors the current flow through the switching transistors 57 and 64 by monitoring the voltage developed across a resistor, such as shunt resistor 23. However, the STICK-TIG circuit is sensitive to the DC voltage between resistor 23 and negative bus 35, which is a function of whether the welding station is placed in the positive ground or the negative ground mode of operation. Therefore, the transformer 100 is used to block this DC voltage so that the STICK-TIG circuit of parameter selection and logic circuits 40 is not sensitive to the mode of operation. Shunt resistor 23 shunts most of the current around pulse transformer 100. Also, because shunt resistor 23 is in the output current path, shunt resistor 23 also limits the peak current that can flow through transistors 57 and 64. One end of the secondary of transformer 100 is connected to the anode of diode 101. The STICK-TIG circuit is also sensitive to voltage polarity. So diode 101 serves as a halfwave rectifier. The other end of the secondary of transformer 100 is connected to one end of resistor 103. The other ends of resistors 102 and 103 are connected by conductors 105 and 106, respectively, to a 1000 ohm load resistor 104 and to the STICK-TIG logic inputs.

The present invention also provides an AC output via the aluminum-TIG output terminals 93 and 94. Two general types of AC outputs are available: a square wave, which may be symmetrical or asymmetrical, for a cleaning/penetration control mode of welding; and a pulsed wave, where there is a variable dead time between the occurrences of pulses, for a voltage control mode of welding. When AC operation is desired, core section 67E is inserted into core 67D. This removes the air gap in core 67D and converts inductor 67 into a transformer. Insertion of core section 67E also affects switch 66. When core section 67E is inserted switch 66A (FIGS. 3A and 3B) changes the drive to transistor 64, switch 66B is opened, which disconnects arc sustaining resistor 61 from the circuit, and switch 66C connects transistor 64, through transformer 67, to the pole of switch 25G. Insertion of core section 67E also causes switches 66D and 66E to switch the inputs of the short circuit detector and the switchover circuit of logic circuits 40 from the standard output terminals 28 and 29 to the aluminum-TIG output terminals 93 and 94 so that the short circuit detector may monitor the AC output for a short circuit condition and the switchover circuit may monitor the AC output for the striking of the arc.

One end of secondary winding 67C is connected to output terminal 94 by conductor 91. The other end of winding 67C is connected to one end of the secondary winding of transformer 86. The other end of the secondary winding of transformer 86 is connected by conductor 92 to output terminal 93. A variable direct current power supply 87A is connected to the primary winding of transformer 86. The fourth winding 67F of transformer 67 is connected to the output of a second variable DC power supply 87B. The number of turns on saturation control winding 67F and the current provided by supply 87B determine the degree of saturation of the core 67D of transformer 67. In the preferred embodiment, supply 87B simply connects winding 67F to buses 22 and 35 through a 100 ohm rheostat. When operating in an AC output mode, such as the aluminum-TIG mode, a jumper 90 is connected between output terminals 28 and 29, and the torch and workpiece are connected to terminals 93 and 94. Alternatively, switches manually operated or controlled by the insertion and removal of plug 67E can be used, instead of jumper 90, to connect terminals 28 and 29 and could also be used to switch a pair of output terminals (not shown) between terminals 28 and 29 and terminals 93 and 94, so that the torch and workpiece connections are always to the same terminals.

Assume now that core 67E is inserted and that jumper 90 has been installed. It will be seen that the end of primary winding 67A with the dot is connected, through output inductor 75, switch 25D, and diode 60, to switching transistor 57. One end of primary winding 67B is connected, through switch 66C and diode 68, to switching transistor 64. The other end of winding 67A is connected to positive conductor 27 through output resistors 76 and 77, switch 25G, and jumper 90. The end of winding 67B with the dot is connected to positive conductor 27 by switch 25G and jumper 90. In this configuration, transformer 67 may be viewed as being configured in a push-pull configuration with transistors 57 and 64 providing the driving action for a tapped primary winding comprising windings 67A and 67B. In the preferred embodiment primary winding 67A has approximately 23 turns, primary winding 67B has approximately 170 turns, secondary winding 67C has approximately 20 turns, and saturation control winding 67F has approximately 200 turns. The relative numbers of turns on winding 67A and 67B are selected to compensate for the higher current flow through transistor 57 with respect to the current flow through transistor 64. Output 1 and output 2 of base drive and protection circuit 52 alternately drive transistors 57 and 64, respectively. In the preferred embodiment, when the AC output mode of operation is selected, only one of these outputs may be on at a time, although both outputs may be off at the same time.

In the preferred embodiment, two modes of operation are possible: the cleaning/penetration control mode, which usually has an asymmetrical AC output; and the voltage control mode, which has a pulsed AC output. In asymmetrical AC operation outputs 1 and 2 are driven 180 degrees out of phase so that when output 1 is on output 2 is off, and vice versa. Because either transistor 57 or transistor 64 will be on at all times varying the pulsewidth of one output of the other output is insufficient to control the arc current. The arc current can be controlled by controlling the degree of coupling between the primary winding 67A, 67B and the secondary winding 67C. The degree of coupling can be controlled by controlling the degree of saturation of core 67D, which is effected by controlling the current flowing through saturation control winding 67F. If no current is flowing through winding 67F, then the degree of saturation will be small or negligible and full coupling will be achieved. However, if supply 87B provides sufficient current to winding 67F to saturate core 67D, then the degree of coupling will be small, thereby limiting the arc current that can be provided. Also, transformer 86 and variable supply 87A form a variable reactor which is in series with secondary winding 67C and is used to control the arc current. The reactance is controlled by varying the degree of saturation of transformer 86. If transformer 86 is saturated then its reactance will be small. However, if no current is flowing through the primary winding of transformer 86 then transformer 86 will be unsaturated and the reactance will be large, thereby limiting the current through the secondary. Variable supply 87A controls the amount of current flowing through the primary of transformer 86, controls the degree of saturation of transformer 86, controls the reactance of transformer 86, and therefore controls the arc current. Therefore, the arc current may be controlled by controlling the degree of saturation of core 67D, the degree of the saturation of the core of transformer 86, or both.

In the voltage control mode, output 1 and output 2 are never on at the same time but may be off at the same time. Therefore, transistor 57 will be turned on for a first predetermined duration, transistors 57 and 64 will both be off for a second predetermined duration, transistor 64 will be on for the first predetermined duration, and then transistors 57 and 64 will be off for the second predetermined duration. The arc current can therefore be controlled by controlling the on time of the two transistors. In the preferred embodiment, the on time for output 1 and the on time for output 2 have the same duration and can be varied from 0 to 50 percent of a cycle. Therefore, in this mode of operation, variable supply 87A is set for maximum output so that the transformer 86 is saturated and provides the least reactance and variable supply 87B is set for minimum output so that core 67D provides maximum coupling. Switches (not shown) can also be used to bypass the secondary of transformer 86 and disconnect winding 67F so that supplies 87A and 87B can be turned off to reduce power consumption. Of course, if desired, variable supplies 87A and 87B can be used in this mode to control the reactance of transformer 86 and the coupling of transformer 67 to provide further current limiting capability.

It will therefore be appreciated that the electronic welding station described above provides positive ground and negative ground welding capability as well as two modes of AC output welding operation. It will also be appreciated that the desired mode of operation can be selected by a switch and a jumper.

In some types of welding operation output inductor 75 and/or output resistor 77 may be undesired or unrequired. Therefore, if desired, either one or both of these components may be bypassed by the use of switches 83 and 84.

Diodes 60 and 68 prevent circulating currents from heating transistors 57 and 64 and from adversely affecting the arc characteristics. Assume, for example, that for a particular condition the base of transistor 57 was positive with respect to the collector of transistor 57. If diode 60 were not in the circuit then current would flow from output 1, through the base-collector junction of transistor 57, through switch 25D, diode 73, switches 25E and 25A, resistor 31 and logic circuits 40, and switches 25C and 54A back into the common terminal of base drive and protection circuit 52. However, diode 60 prevents this circulating current from occurring. Similarly, diode 68 prevents a circulating current from occurring with respect to transistor 64.

The short circuit detector, which is part of logic circuits 40, is described in detail in the above patent and patent applications. Briefly stated, the short circuit detector monitors the outputs for the presence of a voltage which is at least as great as a predetermined value. If the torch is shorted to the workpiece, the output voltage will drop to zero and the short circuit detector will remove the drive signal from base drive and protection circuit 52, thereby turning off transistors 57 and 64 and shutting down the electronic welding station until the short has been removed. In positive ground and negative ground DC output operation, when switch 54 is closed, shunt resistor 61 provides an initial current path so that a DC output voltage appears on the standard output terminals 28 and 29 if they are not shorted together. If a sufficient voltage is present at the output terminals, the short circuit detector of the logic circuits 40 is disarmed and allows a drive signal to be provided to the base drive from protection circuit 52 and then to transistor 57. Therefore, if output terminals 28 and 29 are not shorted, shunt resistor 61 will provide an output voltage even if transistors 57 and 64 are turned off.

In the AC output modes, such as for aluminum-TIG welding, the short circuit detector monitors the aluminum-TIG output terminals 93 and 94. It would seem that the circuit could never turn on because as long as transistors 57 and 64 are turned off there can be no output voltage at terminals 93 and 94 and as long as there is no output voltage at terminals 93 and 94, then the short circuit detector will prevent transistors 57 and 64 from being turned on. However, in the cleaning/penetration control mode of operation, transistor 64 is on when transistor 57 is off. Therefore, when switch 54 is closed, base drive and protection circuit 52 will turn off transistor 57, but will turn on transistor 64. This causes a momentary pulse of current to be provided to transformer 67 so that, if terminals 93 and 94 are not shorted, there will be an output voltage pulse on terminals 93 and 94. This output voltage pulse is sufficient to cause the short circuit detector to be disarmed and allow a drive signal to be provided to the base drive and protection circuit 52, which then proceeds to drive transistors 57 and 64 in a normal manner.

In the voltage control mode of operation, because transistors 57 and 64 are not driven in a true 180° phase relationship, removing the drive signal on conductors 50 and 51 will cause both transistors 57 and 64 to be turned off. Therefore, transistors 57 and 64 are not able to provide a current pulse to disarm the short circuit detector. Also, in this mode, resistor 61 is disconnected by switch 66B and cannot disarm the short circuit detector. It has been found that, in this mode of operation, snubber circuits 58 and 59, even though counteracting each other's effects somewhat, provide the necessary current pulse to transformer 67 to disarm the short circuit detector. More specifically, when switch 54 is closed a current pulse will flow through snubber 58 into primary winding 67A and another current pulse will flow through snubber 59 into primary winding 67B. These current pulses do oppose each other somewhat, but they do not entirely cancel out so a voltage pulse appears on secondary winding 67C. This voltage pulse is sufficient to disarm the short circuit detector in the logic circuits 40. Therefore, in the present invention, in addition to their conventional function, snubber circuits 58 and 59 also provide a starting pulse which disarms the short circuit detector and enables the electronic welding circuit. Of course, if the rod is touched to the workpiece such that terminals 93 and 94 are shorted then the current pulse will be unable to generate a sufficient voltage to disarm the short circuit detector and the electronic welding station will remain inoperative until the short is removed.

Even when plug 67E is removed from core 67D there will be some coupling between windings 67A, 67B and 67C. If winding 67C sees an open circuit then the voltage at terminals 93 and 94 can provide a shock and present a safety hazard. Therefore, a 500 ohm resistor 62 is connected across terminals 93 and 94 and presents a load to winding 67C. This load prevents the voltage across terminals 93 and 94 from being a safety hazard in the positive ground and negative ground modes of operation, and is an inconsequential load in the AC output modes of operation.

Turn now to FIG. 3A which is a diagram of one embodiment of base drive and protection circuit 52. In the preferred embodiment, logic circuits 40 contain a pulsewidth modulator, such as the LM3524 manufactured by National Semiconductor Products, Inc., Santa Clara, Calif. The principals of operation of logic circuits 40 have been described in detail in the above patents and the above patent applications and, therefore, only the modifications thereto will be discussed.

A first emitter output EA for modulator 120 is connected by conductors 50 to the normally open contact of switch 121A, one end of resistor 115, and the anode of the diode of an optoisolator 116, such as the M57215L, manufactured by Mitsubishi Electric Company, Tokyo, Japan. A second emitter output EB is connected by conductor 51 to the pole of switch 121A, one end of resistor 124, and one end of resistor 123. The other end of resistor 124 is connected to the anode of the diode of a second optoisolator 125, such as the MCT-2, manufactured by Motorola, Inc., Phoenix, Ariz. The ground terminal GND of modulator 120 is connected by conductor 49 to the cathodes of the diodes of optoisolators 116 and 125 and to the other ends of resistors 115 and 123. The frequency of oscillation of modulator 120 is controlled by the resistance present between the terminal RT and the ground terminal GND. Terminal RT is connected to one end of potentiometer 126A and potentiometer 126B. The wiper and other end of potentiometer 126A are connected to the normally closed contact switch 121B. The wiper and other end of potentiometer 126B and the pole of switch 121B are connected by conductor 49 to the ground terminal. In the preferred embodiment, potentiometers 126A and 126B have the same value and are ganged.

The transistor of optoisolator 116 is connected to the input of the main transistor bank drive circuit 117. The output of circuit 117 is connected to the input of main transistor bank protection circuit 118. The output of the main transistor bank protection circuit 118 is connected to the base of transistor 57. Transistor 57 is connected as previously described in conjunction with FIG. 2.

The collector of the transistor of optoisolator 125 is connected through resistor 127 and conductor 130 to the VS power input of drive 133 and the +12 volt output of isolated power supply 140. The emitter of the transistor of optoisolator 125 is connected to one end of a pull down resistor 135, the cathode of a 4.7 volt zener diode 134, and the ENABLE input of drive 133. The ground terminal GND and the PULSE input of driver 133 are connected by conductor 132 to the anode of diode 134, the other end of resistor 135, and the −12 volt output of power supply 140. In the preferred embodiment, driver 133 is the SG3635P half bridge driver manufactured by Silicon General, Garden Grove, Calif. The output of driver 133 is connected by conductor 137 to one end of a load resistor 136 and the pole of switch section 121D. The other end of resistor 136 is connected by conductor 131 to the pole of switch section 121C and to the common terminal of power supply 140. The normally closed contact of switch section 121D and normally open contact of switch section 121C are connected by conductor 147 to the source and substrate of an N-channel insulated gate FET and the source and substrate of a P-channel insulated gate FET 150, the anode of diode 146, the cathode of diode 151, and the normally open contact of switch section 66A. Switch section 66A is shown in the normal (DC) position. The drain of transistor 150 and the anode of diode 151 are connected by conductor 142 to the −6 volt output of isolated power supply 141. The drain of transistor 145 and the cathode of diode 146 are connected through current limiting resistor 144 and conductor 143 to the +6 volt output of power supply 141. The common terminal of power supply 141 is connected to emitter bus 55. The pole of switch 66A is connected to the base of transistor 64 through auxiliary transistor bank protection circuit 119.

The normally closed contact of switch section 66A is connected to the output of main transistor bank drive circuit 117. When the welding station is in the positive ground or the negative ground operating mode, transistor 64 is driven by drive circuit 117. In the AC output modes of operation, transistor 64 is driven by FETs 145 and 150.

Assume now that switch 66 is moved to select the AC output mode of operation. In the configuration shown, driver 133 functions as an inverter. That is, when the ENABLE input is high, the output is low (−12 volts). However, with switch 121 in the position shown, the output is connected to the sources of transistors 145 and 150 and the common terminal of power supply 140 is connected to the gates of transistors 145 and 150. Therefore, when the ENABLE input is high transistor 145 is turned on and transistor 150 is turned off, the net result of which is to apply a positive voltage to the base of auxiliary transistor 64 and turn on transistor 64.

If switch 121 is in the other (cleaning/penetration control mode) position, then the output of driver 133 will be connected to the gates of transistors 145 and 150. In this case, when the ENABLE input is high transistor 145 will be turned off and transistor 150 will be turned on, thereby applying a negative voltage to the base of transistor 64 and turning it off.

Construction of isolated power supplies 140 and 141 is well known to those of ordinary skill in the art. Furthermore, the above U.S. patent and patent applications disclose the construction of isolated power supplies for use in an electronic welder and the construction of crowbar and fuse protection circuits such as circuits 118 and 119.

Consider now the effects of switch 121. Switch 121 has two positions: a voltage control mode position, which provides a pulsed output, and a cleaning/penetration control mode position, which provides a symmetrical or an asymmetrical rectangular waveform output. Switch 121 is shown in the voltage control mode position. Outputs EA and EB have three possible operating modes: EA on and EB off; EA off and EB on; and both EA and EB off. When switch 121 is in the position shown, the voltage control mode position, output EA drives optoisolator 116, output EB drives optoisolator 125, and potentiometers 126A and 126B are connected in parallel. If outputs EA and EB are connected in parallel, such as when switch 121 is in the cleaning/penetration control mode position, the output frequency at this paralleled output is equal to the oscillation frequency. However, if outputs EA and EB are used independently, then each output has a frequency of one-half of the oscillation frequency. When switch 121 is in the voltage control mode position, the outputs are independent but, because of the insertion of potentiometer 126A into the oscillation frequency circuit, the oscillation frequency is doubled and, therefore, the output frequency of each output is the same as the original output frequency. Outputs EA and EB have the same frequency and pulsewidth, but are displaced from each by one oscillation cycle of modulator 120. Therefore, modulator 120 drives optoisolator 116 for a first period having a duration of T1, provides no output for a second period having a duration of T2, drives optoisolator 125 for a third period having a duration of T1 and, to complete the cycle, provides no output for a fourth period having a duration of T2. The result is that transistor bank 57 is turned on for a duration T1, there is a dead time of T2, transistor bank 64 is turned for a duration of T1, and then there is another dead time T2.

Consider now the effect of placing switch 121 in the opposite (cleaning/penetration control mode) position. Outputs EA and EB are connected in parallel and simultaneously drive optoisolators 116 and 125. Also, potentiometer 126A is removed from the oscillation circuit of modulator 120 so that the oscillation frequency is determined only by potentiometer 126B. Switch sections 126C and 126D reverse the drive inputs to the FETs 145 and 150 so that, in effect, the signal going into the FETs is inverted. Now, whenever output EA or output EB is on, optoisolator 116 and main transistor bank drive circuit 117 will turn on the main transistor bank 57 and FET 150 will turn off auxiliary transistor bank 64. However, when output EA and output EB are both turned off, then optoisolator 116 and drive circuit 117 will turn off main transistor bank 57, but optoisolator 125, driver 133, and FET 145 will turn on auxiliary transistor bank 64. Therefore, in the cleaning/penetration control mode of operation, either main transistor bank 57 or auxiliary transistor bank 64 is turned on.

Turn now to FIG. 3B which is a diagram of another embodiment of base drive and protection circuit 52. This circuit is similar to the circuit of FIG. 3A except that transistor 64 is always driven by FETs 145 and 150 so that all of the drive components are used in both the DC output modes and the AC output modes of operation. The difference is between the circuit of FIG. 3B and the circuit of FIG. 3A are as follows. Switch 66F, which is part of switch 66, is connected in parallel with switch 121A. In the DC modes of operation switch 66F connects outputs EA and EB together. In the AC modes of operation, switch 66F presents an open circuit. Switch 66G is connected in a series with switch 121B. In the AC modes of operation, switch 66G is closed and, in the DC modes of operation, switch 66G is open. The output of drive 133 is connected by conductor 137 to the pole of switch 66I and one end of resistor 136. For AC output operation, switch 66I connects conductor 137 to the pole of switch 121D. For DC output operation, switch 66I connects conductor 137 to conductor 147, thereby overriding the selection of switch 121D. The end of the resistor 136 is connected to conductor 131 and the pole of switch 66H. In the AC output modes of operation, switch 66H connects conductor 131 to the pole of switch 121C. In the DC modes of operation, switch 66H connects conductor 131 to conductor 148, thereby overriding switch 121C. In the AC output modes of operation, the circuit of FIG. 3B functions exactly as the circuit of FIG. 3A. In the DC modes of operation, switch 66F connects outputs EA and EB of modulator 120 in parallel, switch 66G prevents switch 121B from altering the pulse frequency, and switch sections 66H and 66I connect the output of drive 133 to the inputs of FETs 145 and 150 so that auxiliary transistor bank 64 is always driven by the combination of optoisolator 125, driver 133, and FETs 145 and 150.

Figure 4:
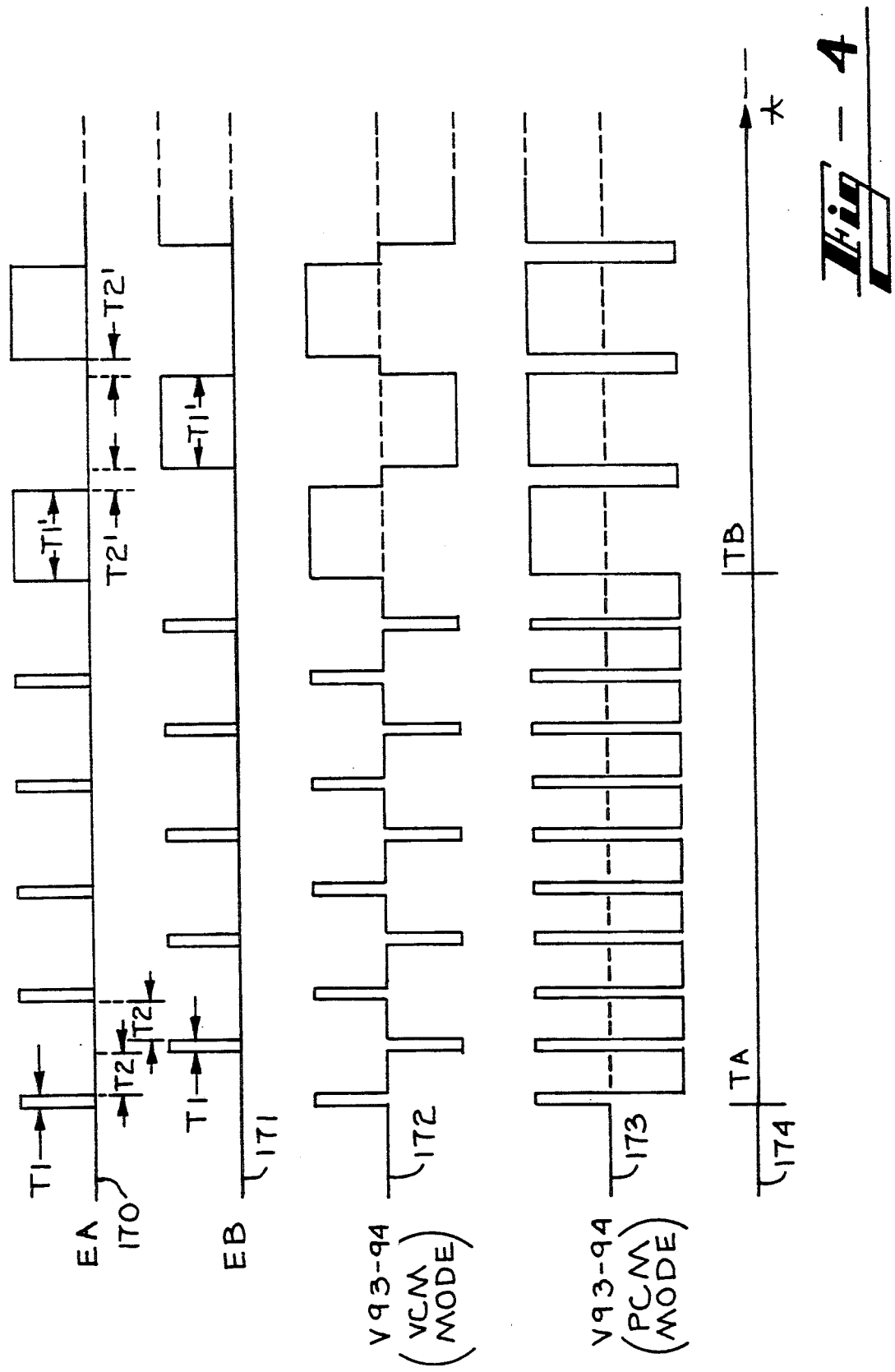
FIG. 4 is an illustration of the AC waveforms that are obtained using the present invention.

Turn now to FIG. 4 which is an illustration of the AC waveforms that are obtained using the present invention. Outputs EA and EB are shown as waveforms 170 and 171, respectively. For clarity of illustration, these outputs are shown as being independent even though switch 121 ties the outputs together in the cleaning/penetration control mode position. Output EA is shown as a series of narrow pulses, having a pulsewidth of T1, from time TA to time TB, and then as a series of wider pulses having a pulsewidth of T1'. Likewise, output EB is also shown as a series of narrow pulses having a pulsewidth T1 from time TA to time TB, and then a series of wider pulses having a pulsewidth of T1'. The dead time, the time when neither output EA nor output EB is active, has a duration of T2 between times TA and TB, and a smaller duration T2' from then on. It will be noticed that outputs EA and EB are offset from each other by a duration (T1+T2) which is equal to one-half of the period of the frequency of oscillation of outputs EA and EB.

It will be recalled from the discussion of FIG. 3 that, in the voltage control mode of operation, output EA drives the main transistor bank 57 and output EB drives the auxiliary transistor 64, and that these transistors drive, in a push-pull configuration, transformer 67. The output at terminals 93 and 94, in the voltage control mode, is shown as waveform 172. It will be noted that the positive and negative pulses have the same duration and that a variable dead time is present between the pulses.

It will also be recalled that, in the cleaning/penetration control mode, outputs EA and EB are connected in parallel and drive main transistor bank 57 and auxiliary transistor bank 64 is a 180° phase relationship. The output of transformer 67 is shown as waveform 173. It will be noted that the pulsewidth of one polarity of output voltage need not be the same as the pulsewidth of the other polarity of output voltage, and that the output is either positive or negative so that there is no dead time, such as the dead time shown in waveform 172.

For convenience, outputs 172 and 173 are shown as if transformer 67 could pass a DC signal. However, it will be appreciated that transformer 67 cannot pass DC and the positive polarity/negative polarity crossover point on these waveforms will vary as a function of the mode of operation, the pulsewidth, the arc current, and the particular characteristics of the welding operation being performed.

Turn now to FIG. 5, which is a schematic diagram of the high/low voltage switchover circuit. The construction and operation of this circuit is essentially the same as the high/low voltage switchover circuit described in the above patents and patent applications. Some changes have been made to the circuit to accommodate the selectable output polarity feature of the present invention. Conductor 38, which is nominally at +80 volts with respect to conductor 39, is connected to the input of a 15 volt regulator 200 and the pole of relay 211. The output of regulator 200 is connected by conductor 201 to the positive terminal of capacitor 202, one end of capacitor 203, one end of resistor 205, and the positive power input of a comparator or operational amplifier 204. The other end of resistor 205 is connected by conductor 207 to the inverting input of comparator 204 and the cathode of an 8.2 volt zener diode 206. The output of comparator 204 is connected by conductor 209 to the cathode of diode 210 and one end of the coil of relay 211. The anode of diode 210 and the other end of the coil of relay 211 are connected to the anode of diode 212. Conductor 39 is connected to the ground terminal of regulator 200, the other ends of capacitors 202 and 203, the anode of zener diode 206, the cathode of diode 212, and the negative power input of comparator 209. The positive output terminal 28 is connected by a removable jumper 240 to the anode of diode 220. The cathode of diode 220 is connected through resistor 221 and conductor 228 to the non-inverting input of comparator 204, one end of a 0.1 microfarad capacitor 222, one end of a 27k resistor 223, one end and the wiper of a 250k potentiometer 224, and the cathode of diode 225. The other end of capacitor 222, resistor 223, and potentiometer 224 are connected to conductor 39.

The positive output of bridge 41 (FIG. 2) is connected by conductor 42 to one end of a 20k potentiometer 232, the cathode of a 12 volt zener diode 233, and the positive input terminal of the amplifier 227A of an isolation amplifier 227, such as the type AD210 manufactured by Analog Devices, Norwood, Mass. The negative output of bridge 41 (FIG. 2) is connected by conductor 43 to the cathode of diode 230. The anode of diode 230 is connected through an 82k current limiting resistor 231 to one end of a 20k potentiometer 232. The wiper of potentiometer 232 is connected to the anode of zener diode 233 and the reference input of amplifier 227A. Amplifier 227A is configured as a unity gain amplifier. The output of amplifier 227A is coupled to the input of amplifier 227C through an isolation circuit 227B. The output of amplifier 227C is connected by conductor 226 to the anode of diode 225. The reference terminal of amplifier 227C is connected to conductor 39. A 12–14 volt DC power supply 234 is connected by conductors 235 and 236 to the internal power supply 227D of isolation amplifier 227.

Regulator 220 provides operating power for comparator 204. Zener diode 206 provides a reference voltage for comparator 204. Resistors 221 and 223 and potentiometer 224 allow for the adjustment of the signal input voltage to comparator 204 so that, before the arc is struck, the voltage at the non-inverting input of comparator 204 is greater than the reference voltage provided by zener diode 206. This causes comparator 204 to energize relay 211, which thereby makes the connection between conductors 38 and 214. Once the arc is struck, the voltage at terminal 28 will drop to a lower voltage and cause the signal input voltage to comparator 204 to be less than the reference voltage. Comparator 204 will then de-energize relay 211 which in turn causes conductors 38 and 213 to be connected. Therefore, +80 volts is applied to conductor 214 before the arc is struck and, once the arc is struck, the +80 volts is then switched to conductor 213. Conductors 213 and 214 are connected to circuits which are required to switch functions depending on whether the arc has or has not yet been struck, or whether the arc is present or is not present, such as circuits which control the pulse repetition frequency, the pulsewidth, the modulating pulse frequency, the modulating pulsewidth, current limiting thresholds, etc. The operation of such circuits is described in the above patent and patent applications.

When the welding station is in the DC output modes of operation, before the arc is struck, positive output terminal 28 will be at approximately +80 volts with respect to negative output terminal 29, the output of amplifier 227C will be a higher voltage than the reference voltage provided by zener diode 206, and comparator 204 will energize relay 211. However, once the arc is struck, the voltage difference between terminals 28 and 29 will drop to approximately 20 volts, which is the arc sustaining voltage. Therefore, the input voltage to amplifier 227A will be reduced and the output voltage of amplifier 227C will drop below the reference voltage provided by zener diode 206. This will cause comparator 204 to de-energize relay 211. Therefore, regardless of whether the welder is operated in the positive ground mode or the negative ground mode, relay 211 will be energized before the arc is struck and de-energized after the arc is struck.

The operation of the circuit is the same for the two AC output modes of operation but, in these modes, switch sections 66D and 66E switch the inputs for the switchover circuit from terminals 28 and 29 to terminals 93 and 94 so that the switchover circuit monitors the AC output voltage.

Calibration of the circuit is as follows. Potentiometer 232 is first adjusted so that the wiper is connected to conductor 42. This disables isolation amplifier 227. A jumper 240 is then connected between positive output terminal 28 and the anode of diode 220. Potentiometer 224 is then adjusted so that relay 211 is energized before the arc has been struck and de-energized once the arc has been struck. Jumper 240 is then disconnected and potentiometer 232 is adjusted so that relay 211 is energized before the arc is struck and de-energized after the arc has been struck. It will be appreciated that the output of isolation amplifier 227 can be used to directly drive a buffer amplifier which in turn drives relay 211. In this case, comparator 204 would be replaced by a buffer amplifier and most or all of components 205, 206, 220, 221, and 224 could be eliminated. However, the inventor desires that this circuit be compatible with other electronic welding stations manufactured by the inventor, such as those described in the above patent and patent applications. Therefore, in the preferred embodiments, all the components are placed on a single circuit board and, for welding stations which do not have the reversible polarity or AC outputs, conductors 42 and 43 are disconnected and the jumper 240 is installed. On electronic welding stations which have these additional output features, jumper 240 is disconnected and conductors 42 and 43 are connected.

Turn now to FIG. 6 which is a schematic diagram of the fan speed control and the wire feed speed control circuits. The switched 80 volt line 213 from the high/low voltage switchover circuit (FIG. 5) is connected to one end of the coil 250A of transfer relay 250. The other end of coil 250A is connected to the fused 80 volt return line 39. After the welder has pulled the trigger switch, but before the arc has been struck, conductor 213 will not have any voltage applied to it and the coil 250A of relay 250 will not be energized. However, once the arc has been struck, conductor 213 will have 80 volts applied to it and coil 250A of relay 250 will be energized. Conductor 22, which is connected to +80 volts, is connected to the normally open contact of relay section 205B and to the normally closed contact of switch section 25H. As will be recalled from an inspection of FIG. 2, switch 25 is used to select positive ground or negative ground operation. The pole of switch section 25H is connected to the normally closed contact of relay section 250B. The pole of relay section 250B is connected by conductor 251 to one end of resistor 252, one end of resistor 257, and the pole of relay section 250C. The tap on resistor 252 is connected by conductor 253 to the positive power input of the wire feeder motor and speed control circuit 254. Conductor 35, which is the 80 volt return conductor, is connected to the other end of resistor 252, fan and reversing circuit 260, and the negative power input of the wire feeder motor and speed control circuit 254. The normally open contact of relay section 250C is connected by conductor 255 to the contact of switch 54B. The pole of switch 54B is connected by conductor 256 to the other end of resistor 257 and to the fan and reversing circuit 260. Conductor 85 is connected to the normally open contact of switch section 25H. It will be recalled from an inspection of FIG. 2 that conductor 85 is connected to the junction between the output inductors/transformers 67 and 75 and the output resistors 76 and 77.

In the positive ground mode and in the AC modes of operation, after the welder pulls the trigger, but before the arc is struck, relay 250 will not be energized and the full 80 volts on conductor 22 will be applied via switch section 25H and relay section 250B to resistors 252 and 257. Resistor 252 is tapped so as to provide only 50 to 65 volts, with respect to conductor 35, to the wire feeder control circuit 254. Resistor 257, which is in series with fan and reversing circuit 260, reduces the voltage available to circuit 260 so as to reduce the fan speed and prolong the life of the fan brushes. The function of resistor 257 and the construction and operation of fan and reversing circuit 260 is described in detail in the above patent applications. Once the arc has been struck, relay 250 will be energized and the full +80 volts on conductor 22 will be applied to resistor 252, as before, and will also be directly applied to the fan and reversing circuit 260 through relay section 250C and switch section 54B. Therefore, once the arc has been struck, the fan of circuit 260 will run at the high speed necessary to cool the electronic welding station and prevent it from overheating. Resistor 252 will again tap down the voltage so as to provide the desired 50 to 64 volts to wire feed circuit 254.

When negative ground operation is selected, the normally closed contact of relay section 250B will be connected via switch section 25H to conductor 85. Therefore, once the trigger 54 is pulled, but before the arc has been struck, relay 250 will not be energized and the wire feed circuit 254 and the fan and reversing circuit 260 will be powered by the main transistor bank 57. Resistors 252 and 257 reduce the voltage so that wire feed circuit 254 and fan and reversing circuit 260, respectively, once again receive the proper operating voltage. However, once the arc has been struck, relay 250 will be energized and wire feeder circuit 254 and fan and reversing circuit 260 will be powered directly from the 80 volt conductor 22. Again, once the arc has been struck, the fan of circuit 260 will run at full speed and resistor 252 will tap down the voltage for wire feed circuit 254. This circuit, in conjunction with the high/low voltage switchover circuit of FIG. 5, serves to maintain the proper voltage and polarity for the fan and reversing circuit 60 and the wire feeder motor and speed control circuit 254, regardless of the mode of operation of the electronic welder.

Turn now to FIG. 7A which is a schematic diagram of the transistor failure selection circuit of the present invention, and FIG. 7B which is an illustration of a typical environment in which the present invention is used. Base drive and protection circuit 52 has a plurality of outputs: 1A through 1N. Each of these outputs is independently protected by fuse and crowbar circuits described in the above reference patent applications. Outputs 1A through 1N are connected to the bases of transistors 57A through 57N, respectively, through balancing/current limiting resistors 271A through 271N, respectively. The COMMON terminal of base drive and protection circuit 52 is connected through conductor 55 and a plurality of emitter resistors 56A through 56N to the emitters of transistors 57A though 57N, respectively. The collectors of transistors 57A through 57N are connected to the cathode of diode 60 and the anode of diode 60 is connected to conductor 30. In a typical environment, transistors 57A through 57N will be mounted on a single heatsink 270. Heatsink 270 and most of transistors 57A through 57N, once installed in the welding station, will typically be very difficult or impossible to access without unsoldering and/or disconnecting and/or removing other circuit boards, fans, switches, relays, etc. In the preferred embodiment of the present invention, at least one of the transistors 57 is readily accessible for removal and replacement. In the preferred embodiment, transistor 57N is at the top part of heatsink 270 and is readily accessible for removal and replacement. An overload condition, short circuit condition, or other condition may occur which causes one of the transistors 57 to fail regardless of the presence of the protection circuits included in the welding station. The present invention is concerned with forcing these conditions to cause the failure of readily accessible transistor 57N in preference to the failure of the less readily accessible transistors 57A-57M. It will be understood that the present invention is not intended to cause the failure of transistor 57N, but is concerned with selecting transistor 57N as the transistor to fail in the event that circumstances or conditions cause an overload which is going to force one of the transistors 57 to fail.

In the preferred embodiment, the preferential failure of transistor 57N is achieved by the use of a higher value for base resistor 271N than the value for base resistors 271A through 271M. The higher value for base resistor 271N limits the base drive for transistors 57N, as compared to the base drive for transistors 57A through 57M. This will cause transistor 57N to come out of saturation, or near saturation, into the active operating region before any of transistors 57A through 57M. This causes transistor 57N to heat up more than transistors 57A through 57M and transistor 57N then fails first. Generally, this overheating will cause transistor 57N to fail by suffering a collector-base junction short. When the collector-base junction shorts, the collector voltage will be fed back through the base of transistor 57N into output 1N of base drive and protection circuit 52. This will cause the fuse and crowbar circuits in base drive and protection circuit 52 to fire and remove base drive from the remaining transistors 57A through 57M. Once the base drive is removed from transistors 57A through 57M, the remaining current flow will be via transistor 57N. If the condition which caused the overload has not been corrected, then the excessive current will further damage transistor 57N and cause transistor 57N to eventually appear as an open circuit. Therefore, the judicious selection of base resistor 271N is used so that a short circuit or other overload condition causes the failure of transistor 57N in preference to the failure of any of the other transistors 57A through 57M.

In an alternative embodiment, the preferential failure of transistor 57N is achieved by the use of a lower value for emitter resistor 56N than the value for emitter resistors 56A through 56M. The lower value for emitter resistor 56N will also cause transistor 57N to come out of saturation, or near-saturation, before any of transistors 57A through 57M in the event of an overcurrent condition. This also causes transistor 57N to heat up more than transistors 57A through 57M and transistor 57N then fails first. Therefore, the judicious selection of emitter resistor 56N is used so that a short circuit or other overload condition causes the failure of transistor 57N in preference to the failure of any of the other transistors 57A–57M.

Although the above discussion has been directed towards transistor 57N it will be appreciated that the same principles of operation can be applied to cause the preferential failure of a different transistor, such as transistor 57C, if that transistor is the most readily accessible transistor.

Although the above discussion has been directed towards transistor 57N, it will be appreciated that the same principles of operation can be applied to cause the preferential failure of one of the transistors used for transistor 64.

In the preferred embodiment, base resistors 271A through 271M are each constructed of six inches of No. 16 wire. Base resistor 271N is constructed of two 7.5 inch No. 22 wires, connected in parallel. The resistance of No. 16 copper wire is approximately 4.09 ohms per 1,000 feet at 25° C. The resistance of No. 22 copper wire is approximately 16.4 ohms per 1,000 feet at 25° C. Base resistors 271A through 271M, therefore, each have a resistance of approximately 0.002 ohms and base resistor 271N has a resistance of approximately 0.005 ohms. It will be appreciated that other wire sizes and material can be used as long as the base resistor for the selected transistor has a higher value than the base resistor for any of the other transistors. In the preferred embodiment, the ratio of the high value to the low value is approximately 2.5, but this ratio is not critical. The materials used in the preferred embodiment were selected because of their ready availability and low cost.

In the alternative embodiment, emitter resistors 56A through 56M each have a resistance of 0.0125 ohms and emitter resistor 56N has a resistance of 0.01 ohm. In this alternative embodiment, the ratio of the resistance value is approximately 1.25, but this ratio is not critical.

Although the above discussion has been directed towards causing the preferential failure of one transistor 57, it will be appreciated that this technique is not limited to one transistor, but can be used to cause the preferential failure of two or more transistors which are readily accessible. For example, if transistors 57B and 57N were both readily accessible, then base resistors 271B and 271N would have a higher value than the remaining base resistors and/or emitter resistors 56B and 56N would have a lower value than the remaining emitter resistors.

The present invention should also be understood as providing a technique whereby less readily accessible transistors are protected in preference to more readily accessible transistors. Therefore, if transistors 57A through 57M were readily accessible, but transistor 57N was not readily accessible then base resistor 271N and/or emitter resistor 56N would have different values than base resistors 271A through 271M and/or emitter resistors 56A through 56M, respectively, so that transistor 57N would be the least likely to fail in the event of a short circuit or overload condition.

Although the use of resistors in the base and/or emitter circuit of each transistor is preferred, it will be appreciated that transistor selection may also be accomplished by the use of a resistor in the collector circuit of each transistor. In this case the use of a lower value resistance in the collector circuit of the selected transistor will result in a higher collector-emitter voltage, and therefore a higher heat generation, for the selected transistor than for the other transistors. Likewise, a higher value resistance will result in less voltage, less heat generation, and a reduced likelihood of failure.

Also, although the use of bipolar transistors is currently preferred from a cost viewpoint, it will be appreciated that field effect transistors may be used for transistors 57 and 64. In this case, the resistor or resistors would be in the source, drain, and/or gate circuit of each transistor and the resistance value(s) used with the selected transistor would be different than the resistance value(s) used with the other transistors.

Figure 8:
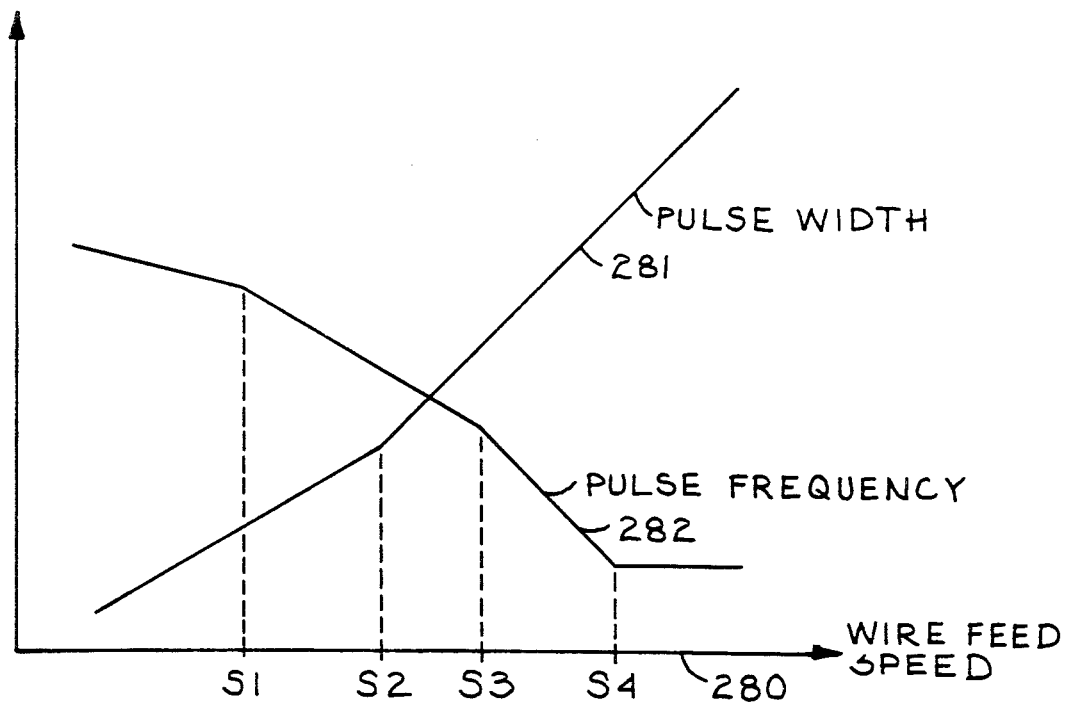
FIG. 8 is a graph depicting the pulsewidth and pulse frequency as a function of the wire feed speed.

Turn now to FIG. 8 which is a graph depicting the pulsewidth and pulse frequency as a function of the wire feed speed for a hypothetical welding operation. The preferred embodiment contemplates a single control which simultaneously varies the pulse frequency, pulsewidth, wire feed speed and/or other parameters. In the method practiced by the present invention a graph, such as that depicted by FIG. 8, it made for a particular welding operation. To arrive at the graph for a particular welding operation, a control parameter is selected, such as the wire feed speed. A first wire feed speed is then selected and the pulse frequency and pulsewidth, or other desired dependent parameter, are varied to achieve the most desirable weld at that wire feed speed. The wire feed speed, the pulse frequency and the pulsewidth, or other desired dependent parameter, are recorded. The wire feed speed is then changed and the pulse frequency and pulsewidth, or other desired dependent parameter, are again varied until the most desirable weld is produced and this information is recorded. This procedure is repeated through the range of wire feed speeds of interest and the recorded data is used to plot a graph of the dependent parameters (pulsewidth, pulse frequency, etc.) as a function of the independent parameter (the wire feed speed). Of course, if desired, the wire feed speed, pulse frequency, and other parameters can be plotted as functions of the pulsewidth or other parameters, the wire feed speed, pulsewidth, and other parameters can be plotted as functions of the pulse frequency or some other parameter, or one or more of these parameters could be plotted as a function of some other parameter.

After the graph is drawn, it will be often noted that the pulsewidth 281 and the pulse frequency 282 are not precise functions nor linear functions of the wire feed speed 280. In the example shown, the pulsewidth 281 has one slope up to wire feed speed S2 and a second slope from that point on. The pulse frequency 282 has a first slope to speed S1, a second slope from speed S1 to speed S3, a third slope from speed S3 to speed S4, and a fourth slope from speed S4 on. It should be noted that FIG. 8 is not intended to be a graph of any particular welding operation but is intended only to be indicative of the type of graph that could be plotted for a welding operation. Once the chart has been made three custom potentiometers can be manufactured and ganged so that the three potentiometers track to produce the charted relationship between the pulsewidth, pulse frequency, and wire feed speed. It will be appreciated that a desired precise and/or non-linear curve can be obtained using, as appropriate, a linear taper or a n on-linear taper for the potentiometer in conjunction with one or more taps, each tap being connected to an appropriate voltage through an appropriate resistor. Even though specific reference has been made to certain parameters being dependent upon the wire feed speed, the present invention contemplates and includes the concept of one more selected parameters (pulse frequency, pulsewidth, gas flow rate, etc.) being dependent upon a preselected independent parameter (wire feed speed, torch travel rate, etc.).

Figure 9A:
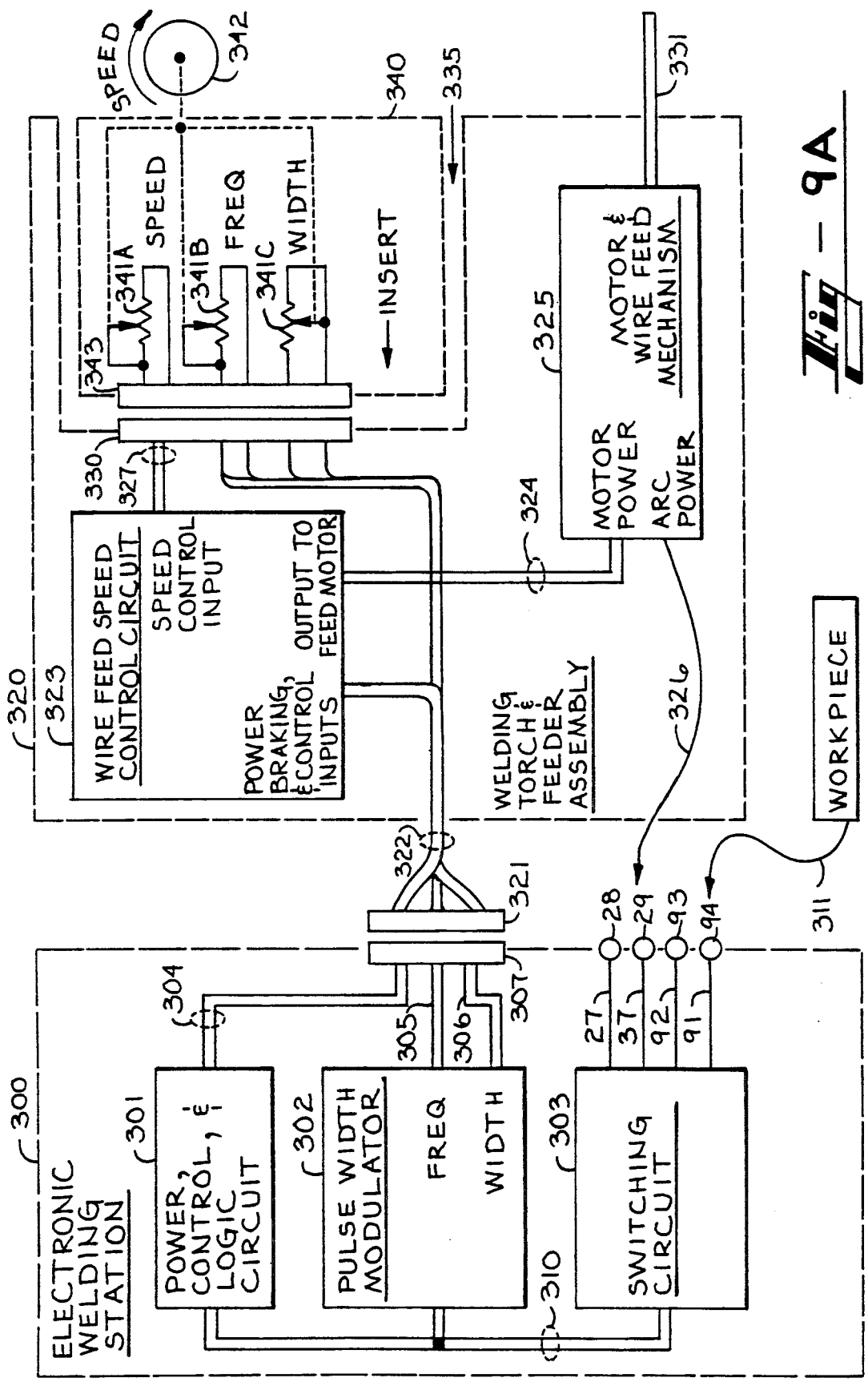
FIG. 9A is a schematic of the preferred embodiment of the present invention which utilizes the chart of FIG. 8.
Figure 9B:
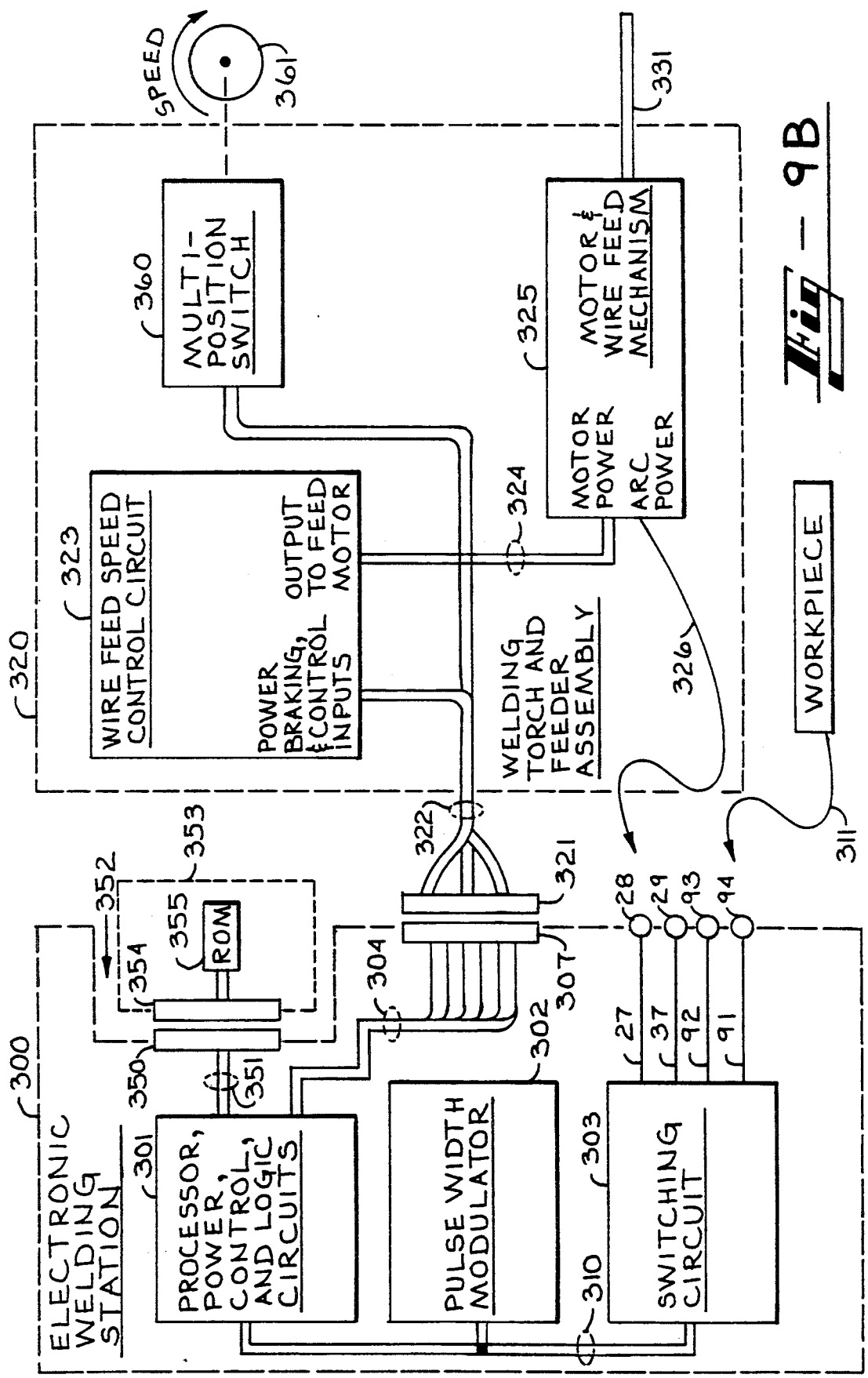
FIG. 9B is an alternative embodiment of the present invention using a read-only memory module.

Although the chart depicted in FIG. 8 and the embodiments depicted in FIGS. 9A and 9B indicate that two parameters, such as the pulsewidth and the pulse frequency, will be dependent upon a control parameter, such as the wire feed speed, it will be appreciated that circumstances may occur in which only one parameter is dependent upon the control parameter, or more than two parameters are dependent upon the control parameter.

This technique is not limited to pulse arc welding machines but is also applicable to other types of welding machines, such as a standard MIG welding machine operating in a high density spray mode wherein only the wire feed speed and the output voltage are controlled. Of course, it will be appreciated that the output voltage is frequently a function of the pulsewidth and/or the pulse frequency.

Turn now to FIG. 9A which is a schematic of the preferred embodiment of the present invention which utilizes the chart of FIG. 8. An electronic welding station 300 contains a power, control and logic circuit 301, a pulsewidth modulator 302, and a switching circuit 303, interconnected by a single and control bus 310, which carries signals controlling the operation of the electronic welding station 300. A power and control bus 304 connects power, control and logic circuit 301 to connector 307. Pulsewidth modulator 302 has a frequency control input and a pulsewidth control input, which are connected by buses 305 and 306, respectively, to connector 307. The DC output of switching circuit 303 is connected by conductors 27 and 37 to output terminals 28 and 29, respectively, and the AC output of switching circuit 303 is connected by conductors 92 and 91 to output terminals 93 and 94, respectively.

The welding torch and feeder assembly 320 represents the wire feeder and the welding gun and cable assembly (a torch), or a torch with a built-up wire feed motor, etc. Typically, welding torch and feeder assembly 320 will comprise a wire feeder attached to a torch.

The welding torch and feeder assembly 320 contains a wire feed speed control circuit 323 and a motor and wire feed mechanism 325 for feeding welding rod 331. The power, braking, and control inputs of control circuit 323 are connected by bus 322 to connector 321. Bus 322 also connects connector 321 to connector 330. The output of control circuit 323 is connected by bus 324 to the motor power inputs of wire feed mechanism 325. The arc power input of mechanism 325 is connected by conductor 326 to a selected one of output terminals 28, 29, 93 or 94 of electronic welding station 300. The workpiece is connected by conductor 311 to another appropriate output terminal. The speed control input of control circuit 323 is connected by bus 327 to connector 330. In the preferred embodiment, welding torch and feeder assembly 320 has an opening or cavity 335 into which a control module 340 can be inserted. Because of size limitations, module 340 would typically be inserted into a cavity in the wire feeder, as opposed to the torch. However, if module 340 were small enough, then it could be inserted into a cavity on the torch.

Control module 340 preferably has a control knob 342, a three-gang potentiometer 341, and a connector 343. When module 340 is inserted into cavity 335 such that connectors 330 and 343 are mated, speed control potentiometer 341A will be connected to the speed control input of control circuit 323 and frequency and pulsewidth potentiometers 341B and 341C, respectively, will be connected to the frequency and pulsewidth control inputs, respectively, of pulsewidth modulator 302. Turning knob 342 simultaneously adjusts the wire feed speed, the pulse frequency, and the pulsewidth so as to produce a quality weld at the highest possible wire feed speed. This approach allows the person doing the welding to adjust the wire feed speed to match his own capabilities, which may vary from day to day and even within a day, without having to stop and readjust the pulse frequency and pulsewidth to produce the desired weld. The efficiency and speed of the welding operator are thus improved and the quality of the weld is less susceptible to misadjustment of controls by the operator.

It is preferred that control knob 342 and potentiometers 341A-341C be part of a replaceable module 340. This allows one module to be used for a first type of welding operation, such as where the workpiece is steel, and another module, customized for aluminum, to be used when the workpiece is aluminum plate. For a given project, the number of different types of welding operations is usually very limited so that a relatively small number of replaceable modules 340 will provide the welding operator with an electronic welding station whose characteristics are tailored to the particular welding operation being performed. It is preferred that the module 340 be inserted into the welding torch and feeder assembly 320 so that the welding operator does not have to interrupt the welding operation and leave the work in order to make an adjustment to the welding arc characteristics. However, the present invention should be understood as contemplating and including the concept of the electronic welding station 300 having a receptacle of cavity into which the control module 340 can be inserted. Also, even though modules 340 are preferred so as to allow the arc characteristics to be tailored for a variety of welding operations, the present invention should also be understood as contemplating and including the concept of the potentiometers 341A-341C being hardwired into either welding torch and feeder assembly 320 for electronic welding station 300.

Turn now to FIG. 9B which is an alternative embodiment of the present invention using a read-only memory module. The construction and operation of the embodiment of FIG. 9B is identical to that of FIG. 9A except for the following differences. In addition to power, control and logic circuits, component 301 also contains a processor. Circuit 301 is connected by bus 351 to connector 350. Module 353 contains a read-only memory 355 which is connected to connector 354. Connector 354 is designed to mate with connector 350 when module 353 is inserted into cavity or receptacle 352. Memory 355 may be a true read-only memory or one of the types of programmable read-only memories. Memory 355 contains information corresponding to the graph of FIG. 8 for a particular type of welding operation. In the preferred embodiment, the memory 355 for each module 353 will contain welding parameter information, such as that depicted by FIG. 8, for only one type of welding operation. However, the present invention should be understood as including and contemplating the concept of a single memory 355 containing welding parameter information for a plurality of different types of welding operations so that a single module 353 will allow the electronic welding station 300 to be used for the variety of welding operations without the necessity of changing module 353. The present invention should also be understood as including and contemplating the concept of memory 355 being hardwired into, and being a part of, the processor, power, control and logic circuits 301.

In the circuit of FIG. 9B, pulsewidth modulator 302 is directly controlled by processor and logic circuits 301. Similarly, wire feed speed control circuit 323 is directly controlled by processor and logic circuits 301 via buses 304 and 322.

The welding torch and feeder assembly 320 contains a multi-position switch 360 which is connected to bus 322. When the welding operator turns control knob 361, switch 360 advises the processor in component 301 of the new switch position. The processor, using the information contained in memory 355, then provides the appropriate new settings for the pulsewidth modulator 302 and wire feed speed control circuits 323. For efficiency and for the convenience of the welding operator, it is preferred that control knob 361 and switch 360 be a part of welding torch 320. However, it should be understood that the present invention includes and contemplates the concept of switch 360 and control 361 being included in the electronic welding station 300.

Turn now to FIG. 10 which is an illustration of the inductor/transformer 67 used in the preferred embodiment. For convenience, windings 67A, 67B, 67C, and 67F are not shown. The dimensions and construction of inductor/transformer 67 are not critical. It is sufficient that the coupling between windings 67A, 67B and 67C be sufficient to allow component 67 to function as a transformer when plug 67E is inserted to complete core 67D, and that the inductance of winding 67A be reduced to allow component 67 to function as a smoothing reactor when plug 67E is removed. Plug 67E is preferably trapezoidal in shape so as to provide for a tight fit which reduces or eliminates any air gaps between core 67D and plug 67E when plug 67E is inserted. In the preferred embodiment, plug 67E is cut from the original core 67D and the cut surfaces are then machined so as to provide good metal-to-metal contact.

From a reading of the above, it will be understood that the present invention comprises improvements to an electronic welding station so as to provide for positive ground, negative ground, and AC modes of operation, a voltage control mode and a cleaning/penetration control mode of AC operation, detection of the arc being struck and adjustment of the cooling fan speed and the wire feed speed accordingly, reduction of the probability of failure of hard to access transistors, selection of readily accessible transistors for failure in the event of overload or short circuit conditions, and use of a single selection control to automatically select the parameters most desirable to perform a particular type of welding operation. Although the preferred embodiment of the present invention has been describe with particularity, modifications to the preferred embodiment and alternative embodiments will suggest themselves to those skilled in the art. Accordingly, the scope of the present invention is to be limited only by the claims below.

I claim:

1. A welding station which, when a damaging overcurrent occurs, fails in a manner which allows for ease of servicing, comprising:
   welding parameter selection and drive means for providing a first drive signal and a second drive signal, said first drive signal and said second drive signal having parameters desired for a selected welding operation;
   switching means for providing an output voltage and an output current to said welding operation, said switching means comprising a first transistor responsive to said first drive signal and a second transistor responsive to said second drive signal, said first transistor being connected in parallel with said second transistor and being located in said welding station so as to be more readily accessible for replacement than said second transistor;
   first biasing means connected to said first transistor; and
   second biasing means connected to said second transistor;
   wherein, when said damaging overcurrent occurs, said first biasing means and said second biasing means cause said first transistor to be less saturated than said second transistor.

2. The welding station of claim 1 wherein:
   said first transistor is a bipolar transistor having an emitter;
   said first biasing means comprising a first resistor connected in series with said emitter of said first transistor, said first resistor having a first resistance;
   said second transistor is a bipolar transistor having an emitter; and
   said second biasing means comprises a second resistor connected in series with said emitter of said second transistor, said second resistor having a resistance which is less than first resistance.

3. The welding station of claim 2 wherein said emitter of said first transistor is connected by said first resistor to a common point and said emitter of said second transistor is connected by said second resistor to said common point.

4. The welding station of claim 1 wherein:
   said first transistor is a bipolar transistor having a base;
   said first biasing means comprises a first resistor connected in series with said base of said first transistor, said first resistor having a first resistance;
   said second transistor is a bipolar resistor having a base; and
   said second biasing means comprises a second resistor connected in series with said base of said second transistor, said second resistor having a resistance which is greater than said first resistance.

5. The welding station of claim 4 wherein said base of said first transistor is connected by said first resistor to a common point and said base of said second transistor is connected by said second resistor to said common point.

6. The welding station of claim 4 wherein said first resistor comprises a first predetermined length of a first conductor and said second resistor comprises a second predetermined length of a second conductor.

7. The welding station of claim 1 wherein:
   said weld parameter selection and drive means provides a plurality of drive signals, said plurality of drive signals comprising said first drive signal and said second drive signal;
   said switching means comprises a plurality of transistors connected in parallel, said plurality of transistors comprising said first transistor and said second transistor, each transistor of said plurality of transistors being responsive to a corresponding drive signal of said plurality of drive signals, said first transistor being located in said welding station so as to be more readily accessible for replacement than any other transistor of said plurality of transistors; and
   a plurality of biasing means, said plurality comprising said first biasing means and said second biasing means, each biasing means of said plurality of biasing means being connected to a corresponding transistor of said plurality of transistors;
   wherein, when said damaging overcurrent occurs, said first biasing means causes said first transistor to be less saturated than any other transistor of said plurality of transistors.

8. The welding station of claim 7 wherein:
   each transistor of said plurality of transistors is a bipolar transistor;
   each biasing means of said plurality of biasing means comprises a resistor connected in series with an emitter of a corresponding transistor of said plurality of transistors; and
   said first biasing means has a resistance which is lower than a resistance of any other biasing means of said plurality of biasing means.

9. The welding station of claim 7 wherein:
   each transistor of said plurality of transistors is a bipolar transistor;
   each biasing means of said plurality of biasing means comprises a resistor connected in series with a base of a corresponding transistor of said plurality of transistors; and said first biasing means has a resistance which is greater than a resistance of any other biasing means of said plurality of biasing means.

10. A welding station which, when a damaging overcurrent occurs, fails in a manner which allows for east of servicing, comprising:

welding parameter selection and drive means for providing a first device signal and a second drive signal, said first drive signal and said second drive signal having parameters desired for a selected welding operation;

switching means for providing an output voltage and an output current to said welding operation, said switching means comprising a first transistor responsive to said first drive signal and a second transistor responsive to said second drive signal, said first transistor being connected in parallel with said second transistor and being located in said welding station so as to be less readily accessible for replacement than said second transistor;

first biasing means connected to said first transistor; and second biasing means connected to said second transistor;

wherein, when said damaging overcurrent occurs, said first biasing means and said second biasing means cause said first transistor to be more saturated than said second transistor.

11. The welding station of claim 10 wherein:

said first transistor is a bipolar transistor having an emitter;

said first biasing means comprises a first resistor connected in series with said emitter of said first transistor, said first resistor having a first resistance;

said second transistor is a bipolar transistor having an emitter; and said second biasing means comprises a second resistor connected in series with said emitter of said second transistor, said second resistor having a resistance which is greater than said first resistance.

12. The welding station of claim 11 wherein said emitter of said first transistor is connected by said first resistor to a common point and said emitter of said second transistor is connected by said second resistor to said common point.

13. The welding station of claim 10 wherein:

said first transistor is bipolar transistor having a base;

said first biasing means comprises a first resistor connected in series with said base of said first transistor, said first resistor having a first resistance;

said second transistor is a bipolar transistor having a base; and said second biasing means comprises a second resistor connected in series with said base of said second transistor, said second resistor having a resistance which is less than said first resistance.

14. The welding station of claim 13 wherein said base of said first transistor is connected by said first resistor to a common point and said base of said second transistor is connected by said second resistor to said common point.

15. The welding station of claim 13 wherein said first resistor comprises a first predetermined length of a first conductor and said second resistor comprises a second predetermined length of a second conductor.

* * * * *